US006912516B1

United States Patent
Ikeda et al.

(10) Patent No.: US 6,912,516 B1
(45) Date of Patent: Jun. 28, 2005

(54) PLACE NAME EXPRESSING DICTIONARY GENERATING METHOD AND ITS APPARATUS

(75) Inventors: Hisashi Ikeda, Kunitachi (JP); Atsushi Kato, Owariasahi (JP); Hiromichi Fujisawa, Tokorozawa (JP); Masashi Koga, Hachioji (JP); Naohiro Furukawa, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 505 days.

(21) Appl. No.: 09/709,435

(22) Filed: Nov. 13, 2000

(30) Foreign Application Priority Data

Nov. 12, 1999 (JP) .............................. 11-322113

(51) Int. Cl.[7] .............................................. G06F 15/18
(52) U.S. Cl. ....................................................... 706/45
(58) Field of Search ................................... 706/45–60

(56) References Cited

U.S. PATENT DOCUMENTS

| 5,717,794 | A | * | 2/1998 | Koga et al. ................. 382/309 |
| 5,768,451 | A | * | 6/1998 | Hisamitsu et al. .......... 382/309 |
| 5,835,922 | A | * | 11/1998 | Shima et al. ................ 715/522 |
| 6,029,123 | A | * | 2/2000 | Suda et al. ..................... 704/9 |
| 6,052,656 | A | * | 4/2000 | Suda et al. ..................... 704/9 |
| 6,219,449 | B1 | * | 4/2001 | Nagaishi ..................... 382/186 |

OTHER PUBLICATIONS

Handwritten Address Interpretation Using Word Recognition With Anad Without Lexicon; M. Shridhar; F. Kimura; (IEEE), 1995, 0–78–3–2559–1/95, pps. 2341–2348.*
Training Agents to Recognize Text BY Example; Henry Lieberman, Bonnie A. Nardi, David Wright, (ACM), 1999, 1–58113–066, pps. 116–122.*

Katsumi Marukawa et al., A Post–Processing Method for Handwritten Kanji Name Recognition Using Furigana Information, Proceedings of the Second International Conference on Document Analysis and Recognition, IEEE Computer Society Press, pp. 218–221.*

Handwritten numeral string recognition: character–level vs. string–level classifier training Cheng–Lin Liu; Marukawa, K.; Pattern Recognition, 2004. ICPR 2004. Proceedings of the 17th International Conference on , vol.: 1, Aug. 2004 pp.: 405–408.*

A method for connecting disappeared junction patterns on frame lines in form documents Shinjo, H.; Nakashima, K.; Koga, M.; Marukawa, K.; Shima, Y.; Hadano, E.;Document Analysis and Recognition, Proc of the 4th Intl Conf., vol. 2, 1997, pp. 667–670.*

(Continued)

*Primary Examiner*—Anthony Knight
*Assistant Examiner*—Michael B. Holmes
(74) *Attorney, Agent, or Firm*—Mattingly, Stanger, Malur & Brundidge, P.C.

(57) ABSTRACT

A method and a machine for generating a dictionary of address phrase expressions. One embodiment of the invention includes an apparatus for generating a dictionary of target phrases that includes an input interface for receiving as its input a first address phrase included in a list of address phrase expressions, a memory for storing a dictionary of address phrase variants, including rules for generating variants of address phrase expressions, and a processing device for generating variants of address phrases which generates a second address phrase which is different in expression from the first address phrase to output the second address phrase to a storage device holding the dictionary of target phrases, based on the input first address phrase, and the knowledge of rules about variants included in the dictionary of address phrase variants.

15 Claims, 21 Drawing Sheets

OTHER PUBLICATIONS

A recursive analysis for form cell recognition Shinjo, H.; Hadano, E.; Marukawa, K.; Shima, Y.; Sako, H.; Document Analysis and Recognition, 2001. Proceedings. Sixth International Conference on , Sep. 10–13, 2001 pp.:694–698.*

A method for street number matching in Japanese address recognition Ogata, H.; Ueda, Y.; Marukawa, K.; Sako, H.; Fujisawa, H.; Document Analysis and Recognition, ICDAR '99. Proceedings of the Fifth International Conference, Sep. 1999 pp. 321–324.*

Optimal techniques in OCR error correction for Japanese texts Hisamitsu, T.; Marukawa, K.; Shima, Y.; Fujisawa, H.; Nitta, Y.; Document Analysis and Recognition, Proceedings of the Third International Conference on , vol. 2, Aug. 1995 pp. 1014–1017.*

A post–processing method for handwritten Kanji name recognition using Furigana information Marukawa, K.; Koga, M.; Shima, Y.; Fujisawa, H.; Document Analysis and Recognition, Proceedings of the $2^{nd}$ International Conference on , Oct. 1993, pp. 218–221.*

A contour fill method for alpha–numeric character image generation Nakshima, K.; Koga, M.; Marukawa, K.; Shima, Y.; Nakano, Y.; Document Analysis and Recognition, Proceedings of the Second International Conference, Oct. 1993 pp.:722–725.*

Katsumi Marukawa, Masashi Koga, Yoshihiro, Shima, Hiromichi Fujisawa; "An Error Correction Algorithm for Handwritten Kanji Address Recognition" vol. 35, No. 6, Jun. 1994, Central Research Laboratory, Hitachi, Ltd., pp. 1101–1110.*

* cited by examiner

FIG.2

| PREFECTURE CODE (201) | PREFECTURE NAME (202) | READING OF PREFECTURE NAME (203) |
|---|---|---|
| 22 | SHIZUOKA-KEN 静岡県 | シズオカケン |
| 23 | AICHI-KEN 愛知県 | アイチケン |
| 24 | MIE-KEN 三重県 | ミエケン |

FIG.3

| CODE OF PREFECTURE (301) | CODE OF CITY, WARD AND COUNTY (302) | NAME OF CITY, WARD AND COUNTY (303) | READING OF NAME OF CITY, WARD AND COUNTY (304) |
|---|---|---|---|
| 23 | 111 | NAGOYA-SHI MINATO-KU 名古屋市港区 | ナゴヤシミナトク |
| 23 | 112 | NAGOYA-SHI MINAMI-KU 名古屋市南区 | ナゴヤシミナミク |
| 23 | 113 | NAGOYA-SHI MORIYAMA-KU 名古屋市守山区 | ナゴヤシモリヤマク |

FIG.4

| CODE OF PREFECTURE | CODE OF CITY, WARD AND COUNTY | TOWN NAME AND LARGER VILLAGE SECTION CODE | TOWN NAME AND LARGER VILLAGE SECTION | READING OF TOWN NAME | NUMBER OF VARIANTS | VARIANT |
|---|---|---|---|---|---|---|
| 401 | 402 | 403 | 404 | 405 | 406 | 407 |
| 23 | 112 | 37 | ISHIMOTO-CHO 石元町 | イシモトチョウ | 1 | ISHIMOTO-CHO 石元町 |
| 23 | 112 | 40 | KASADERA-CHO 笠寺町 | カサデラチョウ | 0 | |
| 23 | 112 | 44 | SHIOYA-CHO 塩屋町 | シオヤチョウ | 0 | |

| CODE OF PREFECTURE | CODE OF CITY, WARD AND COUNTY | TOWN NAME AND LARGER VILLAGE SECTION CODE | SECTION CODE | SECTION NAME | READING OF SECTION | NUMBER OF VARIANTS | VARIANT |
|---|---|---|---|---|---|---|---|
| 501 | 502 | 503 | 504 | 505 | 506 | 507 | 508 |
| 23 | 112 | 13 | 906 | AZA MIYAURA 宇宮浦 | アザミヤウラ | 0 | 0 |
| 23 | 112 | 13 | 907 | AZA NISHIMIYA 宇宮西 | アザミヤニシ | 0 | 0 |
| 23 | 112 | 13 | 908 | AZA TERASAKA 宇寺坂 | アザテラサカ | 0 | 0 |

FIG.6

| POSTAL CODE | PREFECTURE CODE | CITY, WARD AND COUNTY CODE | TOWN NAME AND LARGER VILLAGE SECTION CODE | SECTION CODE |
|---|---|---|---|---|
| 4570075 | 23 | 112 | 37 | |
| 4570051 | 23 | 112 | 40 | 15 |
| 4570078 | 23 | 112 | 44 | |

FIG.7

```
⟨V字⟩ ::= 字;    /*全国共通表現*/
  AZA      AZA   (NATIONALLY COMMON EXPRESSION)

begin           /*愛知県共通*/
                (COMMON IN AICHI PREFECTURE)
         AICHI-KEN           AICHI-KEN
    ⟨P愛知県⟩ ::= 愛知県 ;  NAGOYA-SHI
NAGOYA-SHI⟨O名古屋市⟩ ::= 名古屋市 ;
  MINAMI-KU⟨W南区⟩ ::= 南区 ; MINAMI-KU
                              AICHI-KEN      NAGOYA-SHI       MINAMI-KU
    ⟨C名古屋市南区⟩ ::= [[ ⟨P愛知県⟩ ] ⟨O名古屋市⟩ ] ⟨W南区⟩ ;
       NAGOYA-SHI MINAMI-KU
                          (COMMON IN NAGOYA-SHI MINAMI-KU)
    begin       /*名古屋市南区共通*/
MOTOHOSHIZAKI-MACHI⟨T本星崎町⟩ ::= 本星崎町 ; MOTOHOSHIZAKI-MACHI
       KAIMA⟨V廻間⟩ ::= 廻間 ; KAIMA
     MIYAURA⟨V宮浦⟩ ::= 宮浦 ; MIYAURA
     HORIWARI⟨V掘割⟩ ::= 掘割 ; HORIWARI begin(4570056)
                      NAGOYASHI   MINAMIKU      MOTOHOSHIZAKI-MACHI
            ⟨4570056⟩ ::= ⟨C名古屋市南区⟩ ⟨T本星崎町⟩
                [[ ⟨V字⟩ ]( ⟨V廻間⟩ | ⟨V宮浦⟩ | ⟨V掘割⟩ )] ;
                    AZA        KAIMA      MIYAURA      HORIWARI
        end
    end
end
```

FIG.8

```
START
  │
  ▼
GENERATE DEFINITION FILE OF WHOLE EXPRESSIONS       ~801
  │
  ▼
GENERATE DEFINITION FILE OF ADDRESS PHRASE WORDS    ~802
  │
  ▼
GENERATE DEFINITION FILE OF ADDRESS PHRASE EXPRESSION  ~803
  │
  ▼
END
```

FIG.9

```
#include ⟨DEFINITION FILE OF COMMONLY USED SYNTACTICAL CATEGORY⟩  ~901
begin                                                              ~902
    #include ⟨DEFINITION FILE OF ADDRESS PHRASE WORDS⟩            ~903
    #include ⟨DEFINITION FILE OF ADDRESS PHRASE EXPRESSIONS⟩      ~904
end                                                                ~905
```

FIG.10

```
                    AICHI-KEN         AICHI-KEN
/*!23*/      〈P愛知県〉 ::= 愛知県 ;
                    NAGOYA-SHI MINAMI-KU   NAGOYA-SHI MINAMI-KU
/*!23!112*/  〈C名古屋市南区〉 ::= 名古屋市南区 ;  ~1001
                    OWARI ASAHI-SHI    OWARI ASAHI-SHI  ASAHI-SHI
/*!23!226*/  〈C尾張旭市〉 ::= 尾張旭市 | 旭市 ;  ~1002
                    AICHI-GUN NAGAKUDE-CHO   AICHI-GUN NAGAKUDE-CHO
/*!23!304*/  〈C愛知郡長久手町〉 ::= 愛知郡長久手町 ;  ~1003

KASADERA        OAZA KASADERA
/*!23!112!40*/     〈T笠寺〉 ::= 大字笠寺 ;  ~1004
                        SHIOYA-CHO      SHIOYA-CHO
/*!23!112!44*/     〈T塩屋町〉 ::= 塩屋町 ;
                        OISO-DORI       OISO-DORI
/*!23!112!45*/     〈T大磯通〉 ::= 大磯通
                        SHOTOU          SHOTOU
/*!23!112!40!906*/ 〈V松東〉 ::= 松東 ;
                        JYOUSHIN-CHO    JYOUSHIN-CHO
/*!23!112!40!907*/ 〈V上新町〉 ::= 上新町 ;
```

FIG.11

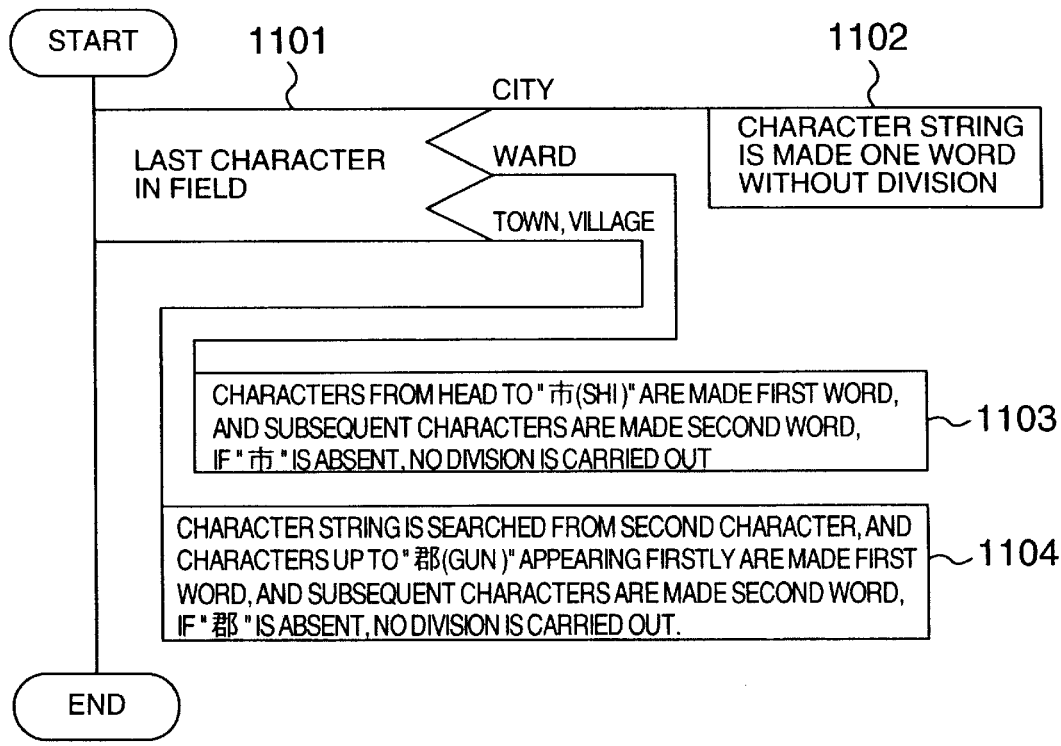

FIG.12

```
                    AICHI-KEN           AICHI-KEN
/*!23*/          ⟨P愛知県⟩ ::= 愛知県 ;
                    NAGOYA-SHI          NAGOYA-SHI
                 ⟨O名古屋市⟩ ::= 名古屋市 ;
                    MINAMI-KU    MINAMI-KU
                 ⟨W南区⟩ ::= 南区 ;
                    NAGOYA-SHI MINAMI-KU       AICHI-KEN        NAGOYA-SHI       MINAMI-KU
/*!23!112*/      ⟨C名古屋市南区⟩ ::= ⟨P愛知県⟩ ⟨O名古屋市⟩ ⟨W南区⟩ ;
                    OWARI ASAHI-SHI     OWARI ASAHI-SHI  ASAHI-SHI
                 ⟨O尾張旭市⟩ ::= 尾張旭市 | 旭市 ;
                    OWARI ASAHI-SHI      AICHI-KEN        OWARI ASAHI-SHI
/*!23!226*/      ⟨C尾張旭市⟩ ::= ⟨P愛知県⟩ ⟨O尾張旭市⟩ ;
                    AICHI-GUN           AICHI-GUN
                 ⟨O愛知郡⟩ ::= 愛知郡 ;
                    NAGAKUDE-CHO        NAGAKUDE-CHO
                 ⟨W長久手町⟩ ::= 長久手町 ;
                    AICHI-GUN NAGAKUDE-CHO    AICHI-KEN     AICHI-GUN       NAGAKUDE-CHO
/*!23!304*/      ⟨C愛知郡長久手町⟩ ::= ⟨P愛知県⟩ ⟨O愛知郡⟩ ⟨W長久手町⟩ ;
```

FIG.13

```
                    AICHI-KEN           AICHI-KEN
/*!23*/          ⟨P愛知県⟩ ::= 愛知県 ;
                    NAGOYA-SHI          NAGOYA-SHI
                 ⟨O名古屋市⟩ ::= 名古屋市 ;
                    MINAMI-KU    MINAMI-KU
                 ⟨W南区⟩ ::= 南区 ;
                    OWARI ASAHI-SHI     OWARI ASAHI-SHI  ASAHI-SHI
                 ⟨O尾張旭市⟩ ::= 尾張旭市 | 旭市 ;
                    AICHI-GUN   AICHI-GUN
                 ⟨O愛知郡⟩ ::= 愛知郡 ;
                    NAGAKUDE-CHO        NAGAKUDE-CHO
                 ⟨W長久手町⟩ ::= 長久手町 ;

KASADERA      OAZA KASADERA
/*!23!112!40*/         ⟨T笠寺⟩ ::= 大字笠寺 ;
                            SHIOYA-CHO    SHIOYA-CHO
/*!23!112!44*/         ⟨T塩屋町⟩ ::= 塩屋町 ;
                            OISO-DOURI    OISO-DOURI
/*!23!112!45*/         ⟨T大磯通⟩ ::= 大磯通
                            SHOUTOU       SHOUTOU
/*!23!112!40!906*/     ⟨V松東⟩ ::= 松東 ;
                            KAMISHIN-CHO  KAMISHIN-CHO
/*!23!112!40!907*/     ⟨V上新町⟩ ::= 上新町 ;
```

```
                 NAGOYA-SHI MINAMI-KU           AICHI-KEN         NAGOYA-SHI      MINAMI-KU
/*!A23!112*/ 〈C名古屋市南区〉 ::= 〈P愛知県〉 〈O名古屋市〉 〈W南区〉 ;
                 OWARI ASAHI-SHI              AICHI-KEN        OWARI ASAHI-SHI
/*!A23!226*/ 〈C尾張旭市〉 ::= 〈P愛知県〉 〈O尾張旭市〉 ;
              AICHI-GUN NAGAKUDE-CHO          AICHI-KEN         AICHI-GUN       NAGAKUDE-CHO
/*!A23!304*/ 〈C愛知郡長久手町〉 ::= 〈P愛知県〉 〈O愛知郡〉 〈W長久手町〉 ;
```

FIG.16

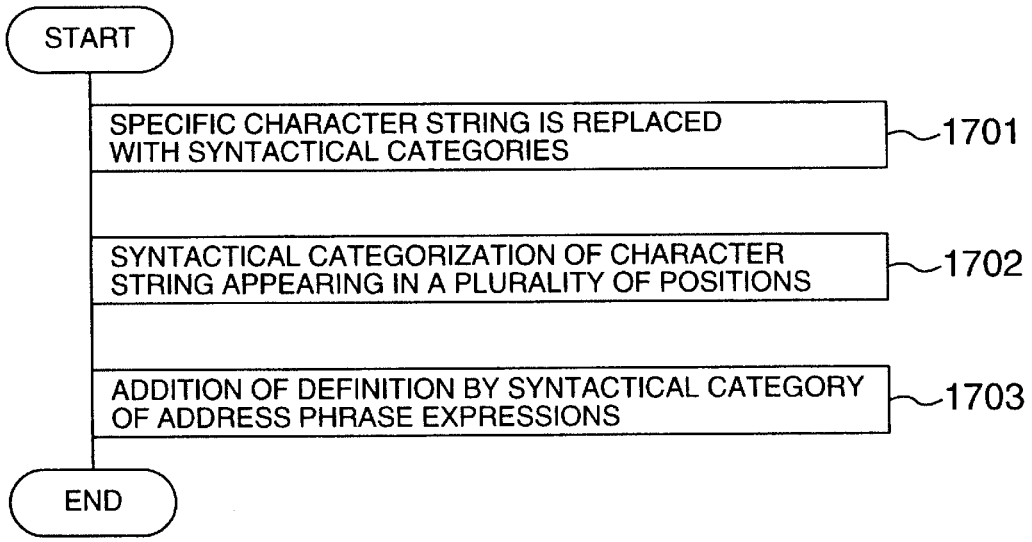

FIG.17

```
START
  │
  ▼
┌─────────────────────────────────────────────────┐
│ SPECIFIC CHARACTER STRING IS REPLACED           │──1701
│ WITH SYNTACTICAL CATEGORIES                     │
└─────────────────────────────────────────────────┘
  │
  ▼
┌─────────────────────────────────────────────────┐
│ SYNTACTICAL CATEGORIZATION OF CHARACTER         │──1702
│ STRING APPEARING IN A PLURALITY OF POSITIONS    │
└─────────────────────────────────────────────────┘
  │
  ▼
┌─────────────────────────────────────────────────┐
│ ADDITION OF DEFINITION BY SYNTACTICAL CATEGORY  │──1703
│ OF ADDRESS PHRASE EXPRESSIONS                   │
└─────────────────────────────────────────────────┘
  │
  ▼
END
```

FIG.18A

```
                        KASADERA      KASADERA
/*!23!112!40*/         〈T笠寺〉  ::= 笠寺 ;
                        OAZA OISO-DOURI   OAZA OISO-DOURI
/*!23!112!45*/         〈T大字大磯通〉 ::= 大字大磯通 ;  ～1801
                        ASAHIGAOKA-CHO    ASAHIGAOKA-CHO
                       〈T旭ヶ丘町〉 ::= 旭ヶ丘町 ;  ～1802
                        KAMINOYAMA-CHO    KAMINOYAMA-CHO
                       〈T上の山町〉 ::= 上の山町 ;  ～1803
```

FIG.18B

```
                        KASADERA      KASADERA
/*!23!112!40*/         〈T笠寺〉  ::= 笠寺 ;
                        OAZA OISO-DOURI     OAZA    OISO-DOURI
/*!23!112!45*/         〈T大字大磯通〉 ::= 〈V大字〉大磯通 ;  ～1804
                        ASAHIGAOKA-CHO   ASAHI  GA   OKA-CHO
                       〈T旭ヶ丘町〉 ::= 旭〈Vヶ〉丘町 ;  ～1805
                        KAMINOYAMA-CHO   KAMI  NO  YAMA-CHO
                       〈T上の山町〉 ::= 上〈Vの〉山町 ;  ～1806
```

FIG.19

```
    NISHISHICHIJYO ONMAEDA-CHO      NISHISHICHIJYO ONMAEDA-CHO
   〈T西七条御前田町〉 ::= 西七条御前田町 ;  ～1901
    NISHISHICHIJYO HIGASHIONMAEDA-CHO   NISHISHICHIJYO HIGASHIONMAEDA-CHO
   〈T西七条東御前田町〉 ::= 西七条東御前田町 ;  ～1902
                    ↓
    NISHISHICHIJYO     NISHISHICHIJYO
   〈V西七条〉 ::= 西七条 ;  ～1903
    NISHISHICHIJYO ONMAEDA-CHO      NISHISHICHIJYO  ONMAEDA-CHO
   〈T西七条御前田町〉 ::= 〈V西七条〉御前田町 ;  ～1904
    NISHISHICHIJYO HIGASHIONMAEDA-CHO    NISHISHICHIJYO  HIGASHIONMAEDA-CHO
   〈T西七条東御前田町〉 ::= 〈V西七条〉東御前田町 ;  ～1905
```

FIG.20A

```
                NAGOYA-SHI MINAMI-KU         AICHI-KEN       NAGOYA-SHI       MINAMI-KU
/*!A23!112*/   〈C名古屋市南区〉 ::= 〈P愛知県〉 〈O名古屋市〉 〈W南区〉;
                OWARI ASAHI-SHI              AICHI-KEN       OWARI ASAHI-SHI
/*!A23!226*/   〈C尾張旭市〉 ::= 〈P愛知県〉 〈O尾張旭市〉;
                OWARI ASAHI-SHI    OWARI ASAHI-SHI
               〈C尾張旭市〉 ::= 〈O尾張旭市〉;
```

FIG.20B

```
                NAGOYA-SHI MINAMI-KU         AICHI-KEN       NAGOYA-SHI       MINAMI-KU
/*!A23!112*/   〈C名古屋市南区〉 ::= 〈P愛知県〉 〈O名古屋市〉 〈W南区〉;
                NAGOYA-SHI MINAMI-KU         NAGOYA-SHI       MINAMI-KU
               〈C名古屋市南区〉 ::= 〈O名古屋市〉 〈W南区〉;  ～2001
                OWARI ASAHI-SHI              AICHI-KEN       OWARI ASAHI-SHI
/*!A23!226*/   〈C尾張旭市〉 ::= 〈P愛知県〉 〈O尾張旭市〉;
                OWARI ASAHI-SHI              OWARI ASAHI-SHI
               〈C尾張旭市〉 ::= 〈O尾張旭市〉;  ～2002
```

FIG.20C

```
                NAGOYA-SHI MINAMI-KU         AICHI-KEN       NAGOYA-SHI       MINAMI-KU
/*!A23!112*/   〈C名古屋市南区〉 ::= 〈P愛知県〉 〈O名古屋市〉 〈W南区〉 |
                                                             NAGOYA-SHI       MINAMI-KU
                                                            〈O名古屋市〉 〈W南区〉;
                OWARI ASAHI-SHI              AICHI-KEN       OWARI ASAHI-SHI
/*!A23!226*/   〈C尾張旭市〉 ::= 〈P愛知県〉 〈O尾張旭市〉 |         ～2003
                                                             OWARI ASAHI-SHI
                                                            〈O尾張旭市〉; ～2004
```

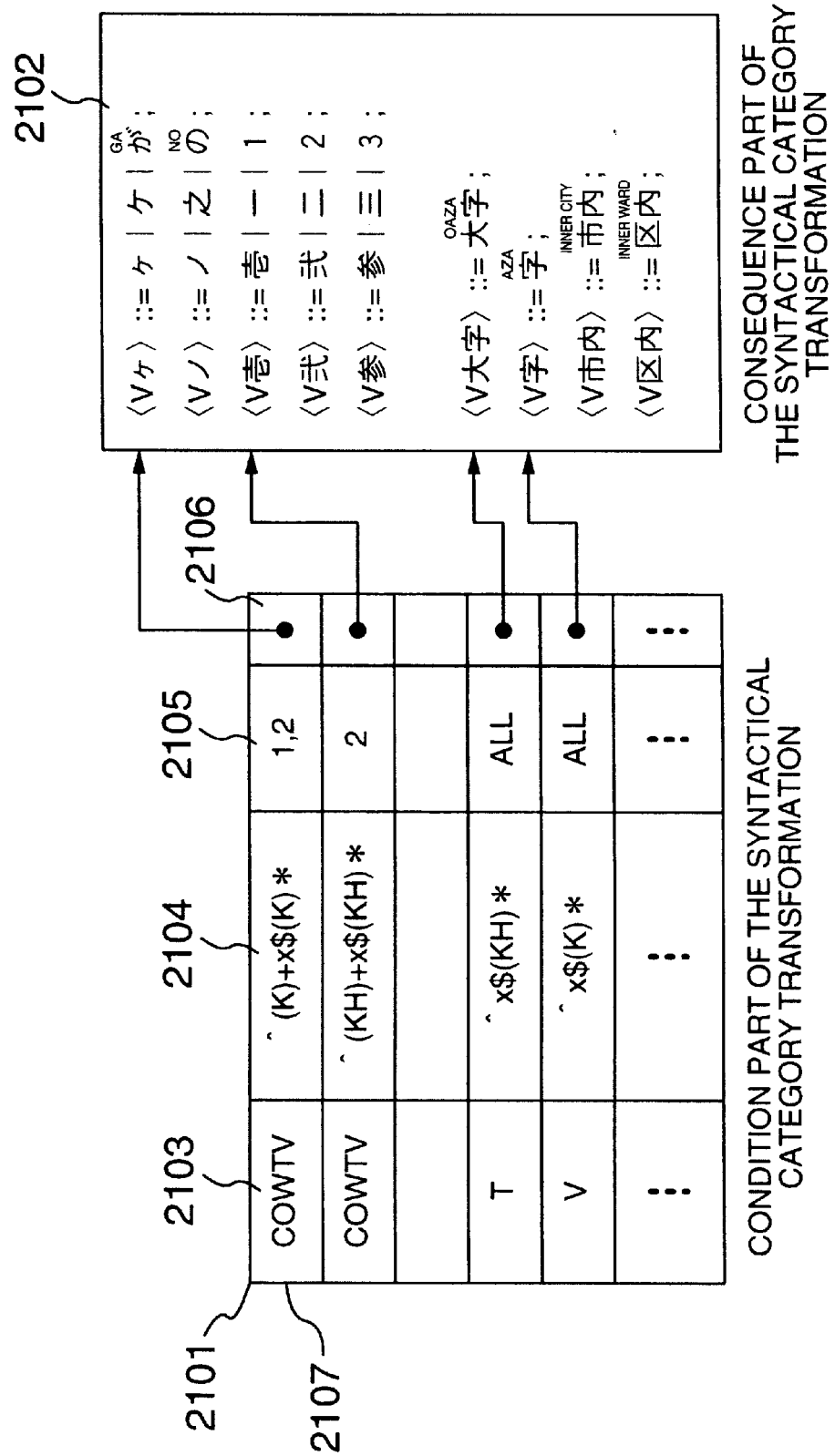

FIG.22

| 2201 | 2202 | 2203 | 2204 |
|---|---|---|---|
| ⟨P.+都⟩ TO | SKIP | 1 | |
| ⟨P.+道⟩ DO | SKIP | 1 | |
| ⟨P.+府⟩ FU | SKIP | 1 | |
| ⟨P.+県⟩ KEN | SKIP | 1 | |
| ⟨P.+県⟩ KEN ⟨O.+⟩ ⟨W.+⟩ | | SKIP | 2 |
| ⟨C.+区⟩ KU | SKIP | 1 | |
| ⟨P.+都⟩ TO ⟨O.+市⟩ SHI | REPLACE | 2 | 市内 INNER CITY |
| ⟨P.+道⟩ DO ⟨O.+市⟩ SHI | REPLACE | 2 | 市内 INNER CITY |
| ⟨P.+府⟩ FU ⟨O.+市⟩ SHI | REPLACE | 2 | 市内 INNER CITY |
| ⟨P.+県⟩ KEN ⟨O.+市⟩ SHI | REPLACE | 2 | 市内 INNER CITY |
| ... | ... | ... | ... |

2205

/*#ADD#*//*!A23!226*/ 〈O尾張旭市〉 ::= 愛知旭市；

/*#DEL#*//*!A23!226*/ 〈O尾張旭市〉 ::= 旭市；

FIG.30

South 9th Street

| S 9th St | S Ninth Street |
|---|---|
| South 9th St | South Ninth Street |
| 9th St | Ninth Street |
| S Ninth St | S 9th |
| South Ninth St | South 9th |
| Ninth St | 9th |
| S 9th Street | S Ninth |
| South 9th Street | South Ninth |
| 9th Street | Ninth |

FIG.31

⟨Wsouth⟩ ::=South|south|S;

⟨W9th⟩ ::=Ninth|ninth|9th|9;

⟨Wstreet⟩ ::=Street|street|St|st;

⟨Wsouth9thstreet⟩ ::= ⟨Wsouth⟩ ⟨W9th⟩ [ ⟨Wstreet⟩ ];

US 6,912,516 B1

PLACE NAME EXPRESSING DICTIONARY GENERATING METHOD AND ITS APPARATUS

BACKGROUND OF THE INVENTION

1. Field of the Invention

The present invention relates, in the processing of reading out the information relating to address phrase expressions which processing is executed in a mail sorting machine or the like, to a method and a machine for generating a dictionary of address phrase expressions which is mainly used when executing the processing of matching character strings. More particularly, the invention relates to a method and a machine for generating a dictionary of address phrase expressions including the difference of a line of words and the difference of characters in the address phrase expression (hereinafter, referred to as "the variants" for short, when applicable) from a list of address phrase expressions which are expressed by the standard expression.

2. Description of the Related Art

It is general that in order to read out the character strings one after another, the processing consisting of the following three steps is executed.

(1) The step of character segmentation: character segmentation of a character pattern from an image of a character line.

(2) The step of classifying a character: classification of the character category (character code) of each of character patterns.

(3) The step of matching character strings: each of character strings, which are previously stored, as an object of the reading-out processing, is matched with the result of classifying the characters to output the character string candidates.

As for the technology relating to (1) the step of character segmentation and (2) the step of classifying a character, for example, there are known an article of Koga et al., "SEGMENTATION OF JAPANESE HANDWRITTEN CHARACTERS USING PERIPHERAL FEATURE ANALYSIS", International Conference for Pattern Recognition, pp. 1137 to 1141, 1998, and the like.

As for the technology relating to (3) the step of matching character strings, there are the system wherein the finite state automation is generated from the lattice of the result of classifying characters, and the character strings as an object of the reading-out processing are inputted thereto to extract the candidate words (refer to an article of Marukawa et al., "AN ERROR CORRECTION ALGORITHM FOR HARD-WRITTEN KANJI ADDRESS RECOGNITION", Journal of Information Processing Society of Japan, Vol. 35, No. 6), and the like. In addition thereto, there are the system wherein the character segmentation, the character classification and the character strings matching are carried out at the same time by employing the Hidden Markov Models (refer to an article of A. Kaltenmeier, "SOPHISTICATED TOPOLOGY OF HIDDEN MARKOV MODELS FOR CURSIVE SCRIPT RECOGNITION", Proceedings of International Conference of Document Analysis and Recognition, '93, pp. 139 to 142, 1993) and the method wherein the character strings are recognized by the search (refer to JAPANESE PATENT APPLICATION No. 238,032 of 1997, JP-A-11-85909, entitled "ADDRESS RECOGNITION METHOD" by Koga et al.). Now, a set of character strings as an object of the reading-out processing which are employed herein and which are previously prepared are referred to as a dictionary and the dictionary in which the information relating to the address phrase expressions is stored for reading out associated one(s) of address phrases is referred to as a dictionary of address phrase expressions.

The form of the dictionary of address phrase expressions on a computer memory, for example, in the system by Marukawa et al., is expressed in the form of the tree structure, and in the system based on the Hidden Markov Models and the method of recognizing character strings by the research, adopts the network style. In the processing of matching the character strings, the result of classifying associated one(s) of characters is matched with the character strings as an object of the reading-out processing, whereby the processing of interest has the function of correcting the errors in the character classifying processing. Therefore, in order to enhance the accuracy of reading out character strings, in the case as well where any one of the techniques is adopted, it is necessary that the character strings as an object of the recognition, i.e., the vocabularies must be previously stored in the dictionary file without omission. In other words, it is necessary to enhance the completeness of the dictionary as the ratio of the number of registered phrases to the total number of phrases as an object of the reading-out processing as much as possible.

In the address phrase expressions, "之 (no)" in "上之町 (kamino-machi)" expressed by Chinese characters may also be written in the form of "ノ (no)" or "の (no)" in some cases. Or, the character string of "大字 (ohaza)" may be abbreviated in the address phrase expression in some cases. In such a manner, the various kinds of different expressions are present. When assuming the address reading-out processing executed by a mail sorting machine, since addresses which are written on the actual postal matters also have the difference in expression present therein as described above, it is essential to the enhancement of the address reading accuracy to register the different address phrase expressions in the dictionary of address phrase expressions in order to increase the completeness of the dictionary. However, when realizing the processing of matching the character strings, it is difficult to prepare from the beginning the dictionary which covers perfectly all of the variants. Then, the work for adding the address phrase variants to the dictionary of address phrase expressions.

Against the problem of addition of the address phrase variants to the dictionary of address phrase expressions, heretofore, there have been known the technique wherein the character string having the partially different Chinese characters which is exemplified by "大田区 (Ota-ku)" to the character string of "大田区 (Ota-ku)" is added manually to enhance the completeness of the dictionary (refer to JP-A-5-169031 entitled "ADDRESS READING AND SORTING MACHINE" by Toyose) and the technique wherein the partial character string such as "越市 (goe-shi)" and "市 (shi)" to "川越市 (Kawagoeshi)" is added as the address phrase variants manually (refer to JP-A-7-39819 entitled "ADDRESS READING AND SORTING MACHINE" by Kojima). In addition, as the technique for increasing the number of character strings registered in the database, there is also known the technique wherein the correspondence table of the address phrase variants of the character strings is previously prepared and on the basis of the correspondence table thus prepared, the address phrase variants are added by utilizing the machine (refer to JP-A-5-165619 entitled "STANDARD NAME GIVING SYSTEM" by Usui et al.).

The address phrase expressions in Japan can be roughly classified into the following four patterns.

(1) The address phrase variants due to the difference of the used characters which are referred to as "the variants by using different characters:

"野々下 (nonoshita)", and "野の下 (nonoshita)",
"野ノ下 (nonoshita)", and the like.

(2) The address phrase variants due to the abbreviation of associated one(s) of words which are referred to as "the variant by abbreviation".

The address phrase variant in which a name of a prefecture is abbreviated, the address phrase variant in which Chinese characters "大字 (Ohaza)" and "字 (Aza)" are abbreviated, and so forth on.

(3) The address phrase variants due to the addition of the character string(s) which are referred to as "the variants" by addition of phrases.

The address phrase variant in which the character string(s) such as "字 (Aza)" which is originally unnecessary for specifying an address is(are) added.

" 埼玉県川越市大字小ヶ谷字東関 (SAITAMA-ken, Kawagoe-shi, Ohaza, ogaya, Aza, Higashizeki)" (while the proper translation of this Japanese address is "Aza Higashizeki, Ohaza Ogaya, Kawagoe-shi, SAITAMA", for the convenience of the category classification based on Japanese style as will be described later, the above expression having the order of categories is adopted, and so forth on) to "埼玉県川越市大字小ヶ谷 (SAITAMA-ken, Kawagoe-shi, Ohaza, Ogaya)", and so forth on.

(4) The address phrase variants due to the popular name and the common name which are referred to as "the variants by aliases".

Its case is frequently found out in KYOTO and the address phrase is expressed by the completely different words:

"京都市下京区烏丸仏光寺下る (Kyoto-shi, Shimogyo-ku, Karasuma, Bukkouji, Kudaru)" to
" 京都市下京区大政所町 (Kyoto-shi, Shimogyo-ku, Ohmandokoro-machi)", and so forth.

For example, giving the address phrase of "埼玉県川越市小ヶ谷 (SAITAMA-ken, Kawagoe-shi, Ogaya)" as an example, in the case alone of (1) the variants by using different characters and (2) the variant by abbreviation, the following twelve expressions are present:

"埼玉県川越市小ヶ谷" (SAITAMA-ken, Kawagoe-shi, Ogaya)
"埼玉県川越市小ヶ谷" (SAITAMA-ken, Kawagoe-shi, Ogaya)
"" (SAITAMA-ken, Kawagoe-shi, Ogaya)
"埼玉県川越市大字小ヶ谷" (SAITAMA-ken, Kawagoe-shi, Ohaza, Ogaya)
"埼玉県川越市大字小ヶ谷" (SAITAMA-ken, Kawagoe-shi, Ohaza, Ogaya)
"埼玉県川越市大字小が谷" (SAITAMA-ken, Kawagoe-shi, Ohaza, Ogaya)
"川越市小ヶ谷" (Kawagoe-shi, Ogaya)>
"川越市小ヶ谷" (Kawagoe-shi, Ogaya)
"川越市小が谷" (Kawagoe-shi, Ogaya)
"川越市小が谷" (Kawagoe-shi, Ohaza, Ogaya)
"川越市小が谷" (Kawagoe-shi, Ohaza, Ogaya)
"川越市大字小が谷" (Kawagoe-shi, Ohaza, Ogaya)

In addition, if (3) the variants by addition of phrases, in which a small-written character is employed altogether, such as "埼玉県川越市小ヶ谷東田 (SAITAMA-ken, Kawagoe-shi, Ogaya, Higashida)", "埼玉県川越市小ヶ谷東関 (SAITAMA-ken, Kawagoe-shi, Ogaya, Higashizeki)" and "県川越市小ヶ谷西関 (SAITAMA-ken, Kawagoe-shi, Ogaya, Nishizeki)" are taken into consideration, and this case is combined with the above-mentioned twelve address phrase variants, the eighty four address phrase variants are present. In addition, if (4) the variants by aliases due to town names and popular names which are remarkably found out in Kyoto-shi and the like is taken into consideration, then the number of address phrase variants in the address phrase expression of Kyoto-shi, Simogyo-ku for example reaches several thousands to several tens of thousands.

In the mail sorting machine and the processing of reading out the addresses, one address even at a minimum, or the addresses of the whole country at a maximum depending on the application of the processing of reading out the address of a plurality of cities, wards and counties, and the address phrases need to be read out, and hence the total number of address phrase expressions reaches equal to or larger than several tens of thousands. Thus, in order to enhance the reading accuracy, it is necessary to generate a dictionary of address phrase variants in which the address phrase variants of those address phrase expressions are added thereto to enhance the completeness of the dictionary. However, it is difficult to add the address phrase expressions reaching several tens of thousands to the dictionary of address phrase expressions in the form of an ad hoc. In addition, even if the correspondence tables for the address phrase variants are prepared by the number of words to intend to add automatically the address phrase variants thereto, the generation of the correspondence tables for the added phrase variants is similarly difficult since the generation thereof must be carried out every word in the form of an ad hoc. Further, with respect to the address phrase variants of a line of words (the abbreviation of a specific word and a specific character string, or the like), since the number of combinations thereof becomes large, it is difficult to have the correspondence tables of the address phrase variants as well as to add those address phrase variants in the form of an ad hoc. Moreover, if the replacement rule for the specific characters is prepared to intend to add automatically the address phrase variants, for example, this results in the wrong address phrase variant such as the replacement of "野 (no)" as the head character of a word with "ノ (no)" being added. Thus, in the dictionary of address phrase expressions thus generated, not only its capacity becomes large, but also the address phrase variant such as the wrong address phrase variant has a bad influence on the reading accuracy.

Now, there is known the technique for in order to suppress the increase in the capacity of the dictionary of address phrase expressions due to the address phrase variants, employing the production rule of the context-free grammar to express the address phrase variants of the address phrase expressions (refer to JAPANESE PATENT APPLICATION NO. 11-187753 entitled "ADDRESS PHRASE EXPRESSING METHOD, AND METHOD AND MACHINE FOR RECOGNIZING CHARACTER STRINGS OF ADDRESS PHRASES" by Koga). That is, the array of characters or syntactical categories is defined every partial string constituting a part of or all of the character string of the address phrase, and hence the character string of the address phrase is expressed by the syntactical categories constituted by the array of the characters or the defined syntactical categories. If Japanese characters of "ヶ (ga)", "ケ (ga)" and "が (ga)" are defined as one syntactical category and also the character string in which the above-mentioned characters are used is defined by that syntactical category, this means that the variants of Japanese characters "ヶ" "ケ" and "が" are added to all of the address phrase expressions. Now, by the syntactical category is meant a set in which for the character strings in which some commoness or the other such as having the equal meaning, the equal usage or the equal pronunciation are present, these character strings are included therein as the constituent elements. In addition, the name which is applied to such a set is referred to as the name of the syntactical category.

Describing the address phrase expressions using the context-free grammar, since the variants of the words and the partial string appearing in a plurality of positions of the address phrase expression(s) are expressed by the same syntactical category, the number of times of works for adding the variants is reduced all the more. However, a part having the variants present therein out of the respective address phrase expressions needs to be replaced with the defined syntactical category. At this time, the work for replacing the partial string having the address phrase expression with the corresponding syntactical category needs to be carried out by manually, and hence the generation of the dictionary of address phrase expressions is likewise difficult.

SUMMARY OF THE INVENTION

In the light of the foregoing, the present invention has been made in order to solve the above-mentioned problems associated with the prior art, and it is therefore an object of the present invention to provide a method of generating a dictionary of address phrase expressions wherein the production and the addition of variants to the address phrase expressions are not carried out in the form of an ad hoc, but those variants are automatically added as much as possible to enhance the completeness of the dictionary.

When the variants can not be automatically added to a dictionary of address phrase expressions, in order to enhance the completeness of the dictionary, the addition of the address phrase expressions needs to be carried out manually. In this case, the contents of addition of the variants to the dictionary of address phrase expressions consist of two sets of expressions which are automatically added thereto and the expressions which are added thereto manually. When generating the dictionary of address phrase expressions, it is the general procedure that a list of address phrase expressions which is constituted by only the standard address phrase expressions are present, and on the basis of the list of address phrase expressions, the variants are generally added thereto as may be necessary to generate the dictionary of address phrase expressions. When the change is added to the list of standard address phrase expressions, in order to reflect that change on the dictionary of address phrase expressions, the processing of adding the variants needs to be executed again. With respect to the expressions, which have been added manually, in the addition to the automatically added expressions, forcing a person who intends to generate the dictionary of address phrase expressions to carry out the same works as th at when the expressions were formerly added thereto may result in the cost required for generating the dictionary being increased as well as lead to an omission of addition of the expressions which were formerly added thereto, and also lead to the reduction of the completeness of the dictionary.

A second object of the present invention is to provide means for adding manually variants of address phrase expressions which could not be automatically generated and added to a dictionary of address phrase expressions, and also to provide means for generating a dictionary of address phrase expressions from a new list of address phrase expressions while preserving the various kinds of variants which were added in generation of the dictionary and the change added to the dictionary of address phrase expressions even when the list of standard address phrase expressions is changed which was the base when generating the dictionary of address phrase expressions.

In the present invention, the text data which is partitioned off by words for each of hierarchies of an address such as prefectures, cities, wards and counties, and a town name and a larger village section, and a section is assumed as the list of standard address phrase expressions. Even when the address phrase expression is not partitioned off by the associated words, the address phrase expression is divided into parts by characters as the key such as "県 (prefecture)" or "市 (city)", whereby the transformation therefor can be readily carried out. In addition, an assembly of the address phrase expressions which are described in accordance with the context-free grammar is assumed as the dictionary of address phrase expressions in the present invention. That is, an array of characters or syntactical category is defined every partial string constituting a part of or all of the address phrase expressions, and the character string of the address phrase expressions is expressed by the syntactical category constituted by the array of characters or the defined syntactical category.

In order to solve the above-mentioned problem that the variants of the address phrase expressions are automatically added to the dictionary of address phrase expressions as much as possible, according to the present invention, there is provided a technique for generating a dictionary of address phrase expressions, the technique including: means for transforming text data of address phrase expression which is partitioned off by words for each of hierarchies of an address into the expression made in accordance with the context-free grammar; and means which has a knowledge for making the character string correspond to the syntactical category in the context-free grammar and a knowledge for making the syntactical category in the context-free grammar and an array of syntactical category correspond to the different syntactical category, and which serves to add the variants to the address phrase expressions, which are expressed in accordance with the context free grammar, using these knowledges.

As for the knowledge for making the character string employed herein correspond to the syntactical category in the context-free grammar, and the knowledge for making the syntactical category in the context-free grammar and an array of syntactical category correspond to the different syntactical category, the following two kinds of knowledges are presented herein.

A1: The knowledge consisting of a definition sentence of the syntactical category according to the context-free grammar for adding the variants relating to the differences of characters in the definition of words expressing an address phrase, and the condition for activating the processing of replacing the character string with the syntactical category. This knowledge is referred to as the knowledge for adding lexical variants.

The characters such as "之", "ノ" and "の" in "上之町", or "カ", "ヶ" and "が" are defined as one syntactical category, and the above-mentioned characters in the character string of the address phrase expression are replaced with the syntactical category.

A2: The knowledge consisting of the items in which the contents of the newly added definition sentence such as the replacement and the abbreviation for the syntactical category are described with a line of the syntactical category in the definition sentence of the address phrase expressions as the condition. This knowledge is referred to as "the knowledge for adding syntactical variants.

For a line of the syntactical category of a prefecture name, and a city, ward or county name which are described in this order, a line of the different syntactical category is defined for a line of the specific syntactical category as describing that a prefecture name may be abbreviated.

Means for when the expression(s) which can not be automatically added to a dictionary of address phrase expressions is(are) present, if the corresponding syntactical category and an array of syntactical category are specified, displaying thereon a character string which is expressed by the category of interest; means for inputting therethrough a character string(s); and means for adding a character string which has been inputted by a person who generated the dictionary of address phrase expressions to the address phrase expressions which are expressed by the syntactical category are provided so that the address phrase expression (s) which could not been automatically added can be added to the dictionary of address phrase expressions.

In addition, the means for adding a character string which has been inputted by a person who generated the dictionary of address phrase expressions to the address phrase expressions which are expressed by the syntactical category includes: means for generating the syntactical category consisting of only the character strings of the added address phrase expressions on a memory, or outputting them to a file; and means for adding the character strings of the added address phrase expressions which have been outputted to the above-mentioned file to the dictionary of address phrase expressions which are expressed in accordance with the context-free grammar, whereby the variants which could not been automatically generated and added to the dictionary of address phrase expressions can be added thereto manually, and also even when the list of address phrase expressions which is partitioned off by the associated words for each of hierarchies of an address is changed, a new dictionary of address phrase expressions can be generated while preserving the change(s) which is(are) not added in the generation of the prior dictionary.

While the dictionary of address phrase expressions has been assumed to be the text form in which the character strings of address phrase expressions are enumerated, i.e., of the text form which is described in accordance with the context-free grammar, as for the dictionary of address phrase expressions which is used in the processing of reading out addresses in the mail sorting machine, or other processing of reading out address character strings, there are conceivable the following three kinds of forms:

B1: "The dictionary in text format" which is stored in a file.

B2: "The dictionary on memory" which is stored in a memory.

B3: "The dictionary in binary format" which is in the middle stage between the forms (1) and (2).

When enhancing the easiness of maintenance and the readability of the registered address phrase expressions, the form of "the dictionary in text format" is adopted. In order to realize the affinity to the character string matching and the promotion of the high speed of the processing speed, the form of "the dictionary on memory" is adopted on a computer. In addition, in order to reduce the disk space when preserving the dictionary of address phrase expressions, the form of "the dictionary in binary format" is adopted. Even when adopting any of these three forms, the amount of information, i.e., the registered address phrase expressions are equal to one another. In addition, translating the dictionary source file the information of which is written in accordance with the context-free grammar by using a computer to transform the result information into the form of the dictionary in binary format or the form of the dictionary on memory becomes possible by utilizing the technique which is described in an article of "COMPILER" by Nakada, ISBN4-7828-5057-3 or the like.

While hereinafter, in the present specification, the dictionary in text format of B1 is assumed as the form of the dictionary of address phrase expressions, it should be noted that even when the form of either the dictionary on memory or the dictionary in binary format is adopted for the dictionary of address phrase expressions used in the processing of reading out the address phrases, the present invention can be likewise applied thereto.

BRIEF DESCRIPTION OF THE DRAWINGS

The above and other objects as well as advantages of the present invention will become clear by the following description of the preferred embodiments of the present invention with reference to the accompanying drawings, wherein:

FIG. 2 is a diagram showing an example of a word table expressing prefecture names in a list of address phrase expressions;

FIG. 3 is a diagram showing an example of a word table expressing city, ward and county names in a list of standard address phrase expressions;

FIG. 4 is a diagram showing an example of a word table expressing town names and larger village section names in the list of standard address phrase expressions;

FIG. 5 is a diagram showing an example of a word table expressing section names in the list of standard address phrase expressions;

FIG. 6 is a diagram showing a code table expressing address phrase expressions in the list of standard address phrase expressions;

FIG. 7 is a diagram showing an example of description of address phrase expressions made in accordance with a context-free grammar;

FIG. 8 is a flow chart useful in explaining the processing of transforming the address phrase expressions into the formal language expression;

FIG. 9 is a diagram showing an example of a definition file before adding variants to the whole address phrase expressions;

FIG. 10 is a diagram showing an example of the processing of generating an address phrase word definition file (part 1);

FIG. 11 is a flow chart useful in explaining the processing of dividing words in a city, ward and county field;

FIG. 12 is a diagram showing an example of the processing of generating an address phrase word definition file (part 2);

FIG. 13 is a diagram showing an example of the processing of generating an address phrase word definition file (part 3);

FIG. 16 is a flow chart useful in explaining the processing of generating an address phrase expression definition file (part 2);

FIG. 17 is a flow chart useful in explaining the processing of adding variants on the basis of a knowledge;

FIGS. 18A and 18B are respectively diagrams showing examples in each of which a character string is replaced with a syntactical category on the basis of the knowledge;

FIG. 19 is a diagram showing an example in which a common character string is transformed into a syntactical category;

FIGS. 20A, 20B and 20C are respectively diagrams showing examples in each of which variants are added to the address phrase expressions on the basis of the knowledge;

FIG. 21 is a diagram showing an example of the knowledge for adding variants to the address phrase word definition;

FIG. 22 is a diagram showing an example of the knowledge for adding variants to the address phrase word definition;

FIG. 30 is a diagram showing an example of variants of address phrase expressions in the English sphere;

FIG. 31 is a diagram showing an example in which the expression example shown in FIG. 30 is described in accordance with the context-free grammar.

DESCRIPTION OF THE EMBODIMENTS

Figure 1:
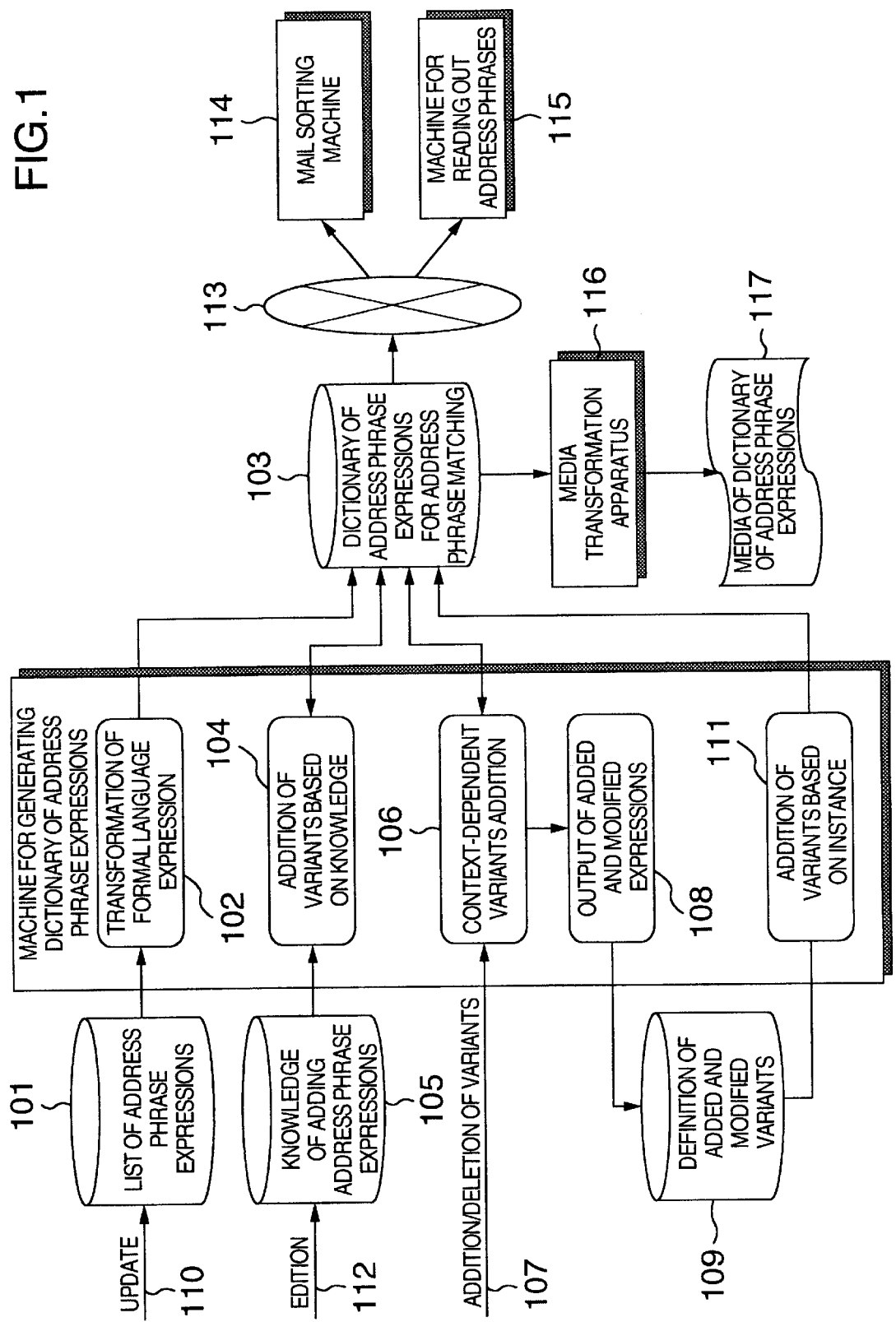
FIG. 1 is a block diagram useful in explaining the whole flow in the processing of generating a dictionary of address phrase expressions according to an embodiment of the present invention.

The generation of a dictionary of address phrase expressions including variants to the address phrase expressions of Japan will hereinafter be described as an example of an embodiment of a method of generating a dictionary of address phrase expressions according to the present invention. Now, it is assumed that by the address phrase expressions of Japan is meant the character string expressing up to a prefecture name, a city, ward and county name and a town name (or a larger village section name, and a section name). That is, in the address of "東京都国分寺市東恋ヶ窪1丁目280 番地(TOKYO-to, Kokubunji-shi, Higasi-Koigakubo, 1-chome, 280-banchi)" (while proper translation of this Japanese address is 280, Higasi-Koigakubo 1-chome, Kokubunji-shi TOKYO, for the convenience of the category classification based on Japanese style, the above expression having the order of categories is adopted, and so forth on), a part of 東京都国分寺市東恋ヶ窪 (TOKYO-to, Kokubunji-shi, Higasi-Koigakubo)" is referred to as the address phrase expression.

First of all, a flow of the processing of generating a dictionary of address phrase expressions will hereinafter be described with reference to FIG. 1.

As an input of the processing of generating a dictionary of address phrase expressions, a list 101 of address phrase expressions as a file in which the standard address phrase expressions are enumerated is prepared. The standard address phrase expression is partitioned off by the associated words to be stored in the list 101 of address phrase expressions in the form of a line of words. In the transformation to the formal language expression 102, the list 101 of address phrase expressions in which the standard address phrase expression partitioned off by the words is stored is transformed into a dictionary of address phrase expressions for address phrase matching in which the address phrase expressions are described in the form adapted to the context-free grammar which is previously defined and in accordance with which the address phrase expressions are expressed therein (hereinafter, referred to as "a dictionary of address phrase expressions" for short, when applicable). In this connection, in this stage, the dictionary of address phrase expressions includes therein only the standard address phrase expressions. In the subsequent processing, the address phrase expressions will be processed in the form expressed in accordance with the context-free grammar. For the standard expressions which are expressed in accordance with the context-free grammar, a variants addition processing 104 based on a knowledge is executed. In this case, there is prepared a knowledge 105 for adding the variants of the address phrase expressions in which the rule such that when a word of "上之町 (Kamino-machi)" is written in the form of "上ノ町" or "上の町" as an input to the processing of reading out the address phrases, "之" which is sandwiched by the two Chinese characters has "ノ"and "の" as the variants thereof, and the rule, relating to the method of expressing an address phrase, such that "大字" of "川越市大字藤間(Kawagoe-shi, Ogaya, Fujima)" may be abbreviated are collected.

For the address phrase expressions to which the variants are added using the knowledge 105 for adding the variants of the address phrase expressions, in a context-dependent variants addition processing 106, the variants are added in the form of an ad hoc manually 107, and then a dictionary 103 of address phrase expressions for the address phrase matching is outputted.

Now, the added variants are the variants, which can not be automatically added using the knowledge 105 for adding the variants of the address phrase expressions, such that "城内市本町" is expressed as "城内市大手前". Out of the dictionary of address phrase expressions for the address phrase matching including the expressions which are added in the context-dependent variants addition processing 106, only a part which has been added and modified is extracted in the added and modified expression output 108 to be outputted and preserved as a definition 109 of added and modified variants in the form of the context-free grammar.

In the case where the change(s) is (are) added to the list 101 of standard address phrase expressions, and so forth 110 so that the processing of generating the dictionary of address phrase expressions is done over again, this definition 109 of added and modified variants is added to the dictionary 103 of address phrase expressions in the form of the variants, which were added in the past, in the variants addition processing 111 based on an instance. This results in that the addition of variants in the form of an ad hoc manually does not need to be carried out whenever generating the dictionary of address phrase expressions, so that the addition made by handwork in the generation of the dictionary of address phrase expressions can be suppressed to a minimum. For the knowledge 105 for adding the variants of the address phrase expressions which is employed herein, an edition work 112 such as addition of the newer knowledge can also be carried out manually.

The dictionary 103 of address phrase expressions which has been generated herein is loaded into the mail sorting machine 114 or other suitable address phrase expression reading machine 105 through a network 113 or the like to be used in the processing of reading out the address phrase expressions.

In addition, for the generated dictionary 103 of address phrase expressions, the storage medium may also be transformed by a media transforming device 116 to be distributed in the form of an address phrase expression media 117.

Next, each of the data, the knowledges and the processing in FIG. 1 will hereinafter be described in detail.

First of all, the description will hereinbelow be given with respect to the list 101 of address phrase expressions out of the data used in FIG. 1. The address phrase expression of Japan can be classified into the words of the hierarchies of (1) prefecture, (2) city, ward and county, (3) town name, and larger village section, and (4) section as may be necessary. For example, the address phrase expression of "東京都国分寺市東恋ヶ窪 (TOKYO-to, Kokubunji-shi, Higasi-koigakubo)" can be divided into the words, i.e., (1) "東京都 (TOKYO-to) as the prefecture name, (2)"国分寺市 (Kokubunji-shi) as the city, ward and county name, and (3) "東恋ヶ窪 (Higasi-koigakubo)" as the town name and the larger village section. In addition, another address phrase expression of "愛知県名古屋市南区本星崎町字宮浦 (AICHI-ken, Nagoya-shi, Minami-ku, Motohosizaki-machi, Aza, Miyaura)" can be divided into the words, i.e., (1) "愛知県 (AICHI-ken)" as the prefecture name, (2) "名古屋市南区 (Nagoya-shi, Minami-ku)" as the city, ward and county name, (3) "本星崎町 (Motohosizaki-machi)" as the town name and the larger village section, and (4) "字宮浦 (Aza, Miyaura)" as the section name. As the list of address phrase expressions in the present embodiment, there is assumed the form that each of the address phrase expressions is divided into the associated words in accordance with the hierarchies of the address, the words belonging to the same hierarchy are collected in the same file, the codes are assigned to the words, respectively, and the address phrase expression is expressed by designating the associated codes assigned to the words. The file in which the words belonging to the same hierarchy are collected is referred to as the list file of address phrases. In addition, in order to read out an address expressed by katakana characters which are frequently written in the addresses of the direct mails and the like, the dictionary of address phrase expressions expressed by katakana characters is also intended to be generated, and hence it is assumed that the words for each of the above-mentioned address hierarchy is given the reading of a Chinese character by writing (printing) kana at its side. When the dictionary of address phrase expressions expressed by katakana characters is not generated, a part, relating to katakana characters, out of the subsequent description may be deleted. The address phrase expression is expressed by the identifier list file which is constituted by a line of pointers to the address phrase words in the above-mentioned list file of address phrase words.

More specifically, the list file of address phrase words relating to the prefecture names is as shown in FIG. 2. A prefecture code 201 is a number which is uniquely assigned to the associated one of prefecture names 202. For a prefecture reading 203, the reading of the prefecture name is stored in the form of katakana characters. The list file of address phrase words for the city, ward and county names is as shown in FIG. 3. A prefecture code 301 is a code of a prefecture where an associated one of cities, wards and counties is present. This code is the same as the prefecture code which is described the list file of address phrase words relating to the prefecture names. A city, ward and county code 302 is a number which is uniquely assigned to an associated one of city, ward and county names 303. When a ward is present as in a government ordinance specified city, the phrase of 名古屋市南区(Nagoya-shi, Minami-ku) is stored as one word. For a city, ward and county name reading 304, the reading of a city, ward and county name is stored in the form of katakana characters. A list file of address phrase words for a town name and a larger village section is as shown in FIG. 4. A prefecture code 401 and a city, ward and county code 402 are codes of a prefecture, and a city, ward and county where an associated one of town names and large village sections is present. A town name and Ohaza (a larger village section) code 403 is a number which is assigned to an associated one of town names and Ohaza names 404. For reading of town name 405, the reading of town names and larger village section names is stored in the form of katakana characters. The standard address phrase expressions may have previously the variants thereof. The variants are stored in a variant column 407 by the number thereof stored in number of variants 406 in the list file of address phrases. For example, when the variants of "石本町(Ishimoto-cho)" 409 to "石元町(Ishimoto-cho)" 408 is present, this variant is stored in the file. Since the variants will be added later in accordance with the rule or manually, the variant field in the list file of address phrase words may be abbreviated. The list file of address phrase words relating to Aza (section) name is as shown in FIG. 5. A prefecture code 501, a city, ward and county code 502, and a town name and larger village section code 503 are respectively codes of a prefecture, a city, ward and county, and a town name and a larger village section where the section of interest is present. A section code 504 is the code which is uniquely assigned to a section name 505. For reading of section 506, the reading of section names is stored in the form of katakana characters. If the variants for the section name are registered, then the fields of the number of variants 507, and variant 508 may also be provided. The address phrase expressions are expressed by a code list file as shown in FIG. 6. Reference number 601 designates a number which is used to classify the associated one of the address phrase expressions, and in this case, for that number, a seven-digit-postal code 601 is employed which is uniquely assigned to the associated one of the address phrase expressions. A prefecture code 602, a city, ward and county, code 603, a town name and larger village section code 604, and a section code 605 are specified by following the postal code, thereby describing the address phrase expressions.

In the present embodiment, while as an input for the processing of generating a dictionary of address phrase expressions, both of the list file of address phrase words and the code list file as described above are assumed, that input may also adopt the list form of the character string expressing the address phrase such as "東京都国分寺市東恋ヶ窪 (TOKYO-to, Kokubunji-shi, Higashi-koigakubo)". For example, for the character string expressing the address phrase, the character string is divided into the words by the characters, becoming the keys, such as "県 (ken)" "市 (shi)", "町 (machi)", "大字 (Ohaza)" and "字 (Aza)", and the codes are assigned thereto, respectively, whereby the character string can be transformed into the form of the list file of address phrase words and the code list file. Therefore, even if the form of the list file of address phrase words and the code list file is assumed for the input of the processing of generating a dictionary of address phrase expressions, the generality is not lost at all.

An example of the context-free grammar in accordance with which the address phrases are expressed, and which is the form in accordance with which the dictionary 103 of address phrase expressions in FIG. 1 is described will hereinafter be shown.

As the terminal symbols of the context-free grammar to be defined, the following symbols are employed. These symbols have the same meaning as that in the BNF Form (Backus-Naur-Form) (refer to an article of Nakada: "COMPILER" ISBN4-7828-5057-3) which is general as the describing method of the context-free grammar.

:: =: Replacement. This symbol means that the syntactical category of the left side is replaced with the syntactical category or the arrangement of characters of the right side.

[ ]: Option. This symbol means that even if the description written within [ ] is present or absent, wither will do.

|: Selection. This symbol means that either the right side or the left side is selected.

( ): Coupling. This symbol means that the contents in the parentheses are evaluated before the variants in front and behind.

< >: A variable name expressing the syntactical category.

;: An end of the sentence.

begin: The beginning of the effective range of a variable.

end: An end of the effective range of a variable.

In addition thereto, a line of Arbic numerals, and a line of Chinese characters, cursive Japanese characters and katakana characters are all used as the end symbol. As non-terminal symbols, the thirteen kinds of symbols, i.e., "address phrase expressions", "area blocks", "town blocks", "area block", "town block", "address phrase declaration", "variable definition", "variable expression", "variable term", "definition of address phrase expressions", "numerical strings", "character strings" and "alphabets" are prepared.

The generation rules expressing this context-free grammar are as follows.

"address phrase expression" "address phrase declaration" "area blocks"

"address phrase expression" "address phrase declaration" "town blocks"

"area blocks" "area blocks" "area block"

"area blocks" "area block"

"town blocks" "town blocks" "town block"

"town blocks" → "town block"

"area block" begin "address phrase declaration" "town blocks" end

"area block" begin "address phrase declaration" "town blocks" end

"town block" begin ("numeral strings")

"address phrase declaration" "definition of address phrase expression" end

"address phrase declaration" "address phrase declaration" "variable definition"

"address name declaration" NULL

"variable definition" →"town name variable":: ="variable expression":

"variable expression" →"variable expression" "variable term"

"variable expression" "variable expression" variable term"

"variable expression" "variable term"

"variable term" → ["variable expression"]

"variable term" → ["variable expression"]

"variable term" → "town name variable"

"variable term" → "character strings"

"definition of address phrase expression"→

<"numerical strings"> :: ="variable expression"

"town name variable" → "alphabets" "character strings">

Now, the non-terminal symbols "numerical strings", "character strings" and "alphabets" express respectively terminal symbols of a line of numerals, a line of Chinese characters, cursive Japanese characters and katakana characters, and one character of alphabets. In addition, these symbols are evaluated in the order of priority in the following order.

(1) Each of the definitions of the syntactical categories which are described by <W "character strings"> and <"numerals">

(2) Parentheses of [ ] and ( ). When the parentheses are employed with the nested parentheses, the contents in the parentheses in the inside are evaluated preferentially.

(3) |

(4):: =

In addition thereto, "# include<file name>" is prepared as the macro-instruction. For this sentence, the file of address phrase expressions which are described in accordance with the context-free grammar specified by "file name" is subjected to the macro expansion. As a result, the dictionary of address phrase expressions can have the address phrase expressions which are described in accordance with the context-free grammar and which are divided into a plurality of parts. For example, if the file is divided in correspondence to the hierarchies of the address, then any of the definition sentences according to the same context-free grammar does not need to be written, and hence the management is readily carried out. In addition, the part surrounded by the symbols ""/*" and "*/" is treated as the comment.

As a typical example, an example in which the address phrase expression including the variants of "愛知県名古屋市南区本星崎町 (AICHI-ken, Nagoya-shi, Minami-ku, Motohoshizaki-cho)" is described in accordance with the context-free grammer is shown in FIG. 7. In the present embodiment, the file of the address phrase expressions which are described in accordance with the context-free grammer is divided into the following four kinds of parts in order to generate the dictionary of address phrase expressions.

C1: a file in which the address phrase word is defined as the syntactical category and which is referred to as a definition file of address phrase words.

C2: a file in which the address phrase expressions are defined in accordance with the syntactical category and which is referred to as a definition file of address phrase expressions.

C3: a file in which the whole address phrase expressions are defined in accordance with the files C1 and C2 and which is referred to as a definition file of whole expressions.

C4: a file in which the character strings which are used irrespective of any of areas are defined as the syntactical category and which is referred to as a definition file of commonly used expression.

The file C4 is the file which is previously prepared as the knowledge 105 for adding variants of address phrase expressions which is used to add previously the variants in the processing of generating the dictionary of address phrase expressions.

Next, the description will hereinafter be given with respect to the processing 102 of transforming the expression of a formal language out of the processings shown in FIG. 1. FIG. 8 is a flow chart useful in explaining a flow of the processing. The processing of transforming the list file of address phrase words of each of the hierarchies of the address and the code list file as the list of standard address phrase expressions into the expression form according to the context-free grammar will hereinafter be described by taking as an example the address phrase expression of "名古屋市南区(Nagoya-shi, Minami-ku)".

As a first step (Step 801) in the processing 102 of transforming a formal language expression, the file in which the whole address phrase expressions are defined is generated. A part of the file in which the whole address phrase expression relating to 名古屋市南区 is defined is shown in FIG. 9. In the generation of the file in which the whole address phrase expressions are defined, first of all, names of the definition file of address phrase words and the definition file of address phrase expressions in 名古屋市南区 of C1 and C2 are set, respectively, to be stored in the memory. Next, in order to refer to the syntactical category which is independent of any of areas, an instruction 901 for including the file C4 is issued to the first line of the definition file of whole expressions. Subsequently, in order that it may be specifically shown to define the address phrase expression of 名古屋市南区 "begin" 902 is outputted to the second line of the file. Then, in order to refer to both of the definition file of address phrase words and the definition file of address phrase expressions, an include sentence 903 of the definition file of address phrase words in 名古屋市南区 and an include sentence 904 of the definition file of address phrase expressions of 名古屋市南区 are outputted to the third line and the fourth line, respectively. Finally, in order that it may be specifically shown to complete the address phrase expression of 名古屋市南区 , an "end" sentence 905 is outputted to the fifth line. When defining the address phrase expressions of a plurality of areas, the generation of a sentence between "begin" and "end" may be repeatedly carried out. In addition, the definition file of address phrase words and the definition file of address phrase expressions are respectively divided in the hierarchies of the prefectures, and cities, wards and counties, whereby when generating the definition file relating to the address phrase expressions extending over a plurality of wards in 名古屋市 for example, the definition file relating to the prefectures or cities has only to be included, and hence the redundancy of the dictionary of address phrase expressions is reduced. In order to attain this procedure, "begin" and "end" may be made the nesting structure.

As the second step in the transformation to the formal language expression 102, the processing 802 of generating the definition file of address phrases is executed. The definition file of address phrase words is generated from the list file of address phrase words in each of the hierarchies of an address. First of all, the syntactical category is generated for the words written in the name of the associated one of prefecture names, the associated one of city, ward and county names, the associated one of town names and larger village section names, and the associated one of section names to be outputted to the definition file of address phrase words. The name of syntactical category is assumed to be the words themselves. At this time, as the alphabets located before the syntactical category name, "P" is assigned to the category of the name of the associated one of the prefectures, "C" is assigned to the category of the name of the associated one of cities, wards and counties, "T" is assigned to the category of the associated one of the town names and the larger village section names, and "V" is assigned to the category of the associated one of the section names. In the case as well where a city name, a ward name and a county name, and a town name and a village name are mixedly present in the city, ward and county name field, the sentence in which these names are defined as one variable without dividing these names is generated. For example, the name of the syntactical category for "愛知県 (AICHI-ken)" becomes "<P愛知県 >". In addition, the syntactical categories are expressed using the code of the prefectures, the code of cities, wards and counties, the code of a town name and a larger village section, and the section code and are added in the form of comments to the heads of the lines, respectively. An example of the definition file of address phrase words which has been generated by executing the processings until now for the address phrase words of 名古屋市南区 is shown in FIG. 10. In a part which is surrounded by the comment symbols "/*" and "*/" of the head of a line, the code expressing the associated ones of the prefectures and the like are described by following "!". For example, in a line 1001, the code "112" expressing 名古屋市南区 following "23" expressing 愛知県 is described with "!" sandwiched between them. The codes are arranged by starting with the prefecture code in accordance with the hierarchies of the address, whereby it is possible to hold the connection relation between the address phrase words. In addition, if the variant relating to the address phrase words as shown in FIG. 3 or FIG. 4 is stored in the list file of address phrase words of the list of address phrase expressions, then the variant of interest is added thereto by partitioning the right side of the definition sentence with the symbol as in a line 1002.

Now, as shown in the line 1001 or a line 1003, in the case where the name of the associated one of cities, wards and counties is "~市~区 (. . . -shi, . . . -ku)" or "~群~町 (. . . -gun, . . . -machi)", a part of "~市 (. . . -shi)" or "~群 (. . . -gun)" is made common, whereby it is possible to reduce the redundancy of the dictionary of address phrase expressions. Then, as the next processing in the processing of generating the definition file of address phrase words, these character strings are divided into the address phrase words. The character strings which are described in the list file of address phrase words relating to the name of the associated one of cities, wards and counties have the following six kinds.

(1)~市

(2)~群~町

(3)~区

(4) ~郡~町

(5) ~町

(6) ~郡~村

(7) ~村

A flow of the processing of dividing address phrase words with respect to the above-mentioned six kinds of character strings will hereinafter be described with reference to FIG. 11. In Step 1101, the last character in the field is firstly looked at, whereby the address phrase words can be divided into the four groups of character strings (1), (2) and (3), (4) and (5), and (6) and (7). With respect to the character string (1), the processing proceeds to Step 1102 in which the character string is in turn made the address phrase words as it is. With respect to the character strings (2) and (3), they can be distinguished on the basis of the fact whether or not "市 (shi)" is included in the character strings. Also, with respect to the last two groups of character strings, they can be distinguished on the basis of the fact whether or not "郡 (gun)" is included in the character strings. Each of the three groups (2), (4) and (6) is divided into two words. The group (2) are divided into words before and after "市 (shi)". While with respect to the groups (4) and (6), likewise, "郡 (gun)" should be made the punctuation, the Chinese character "郡 (gun)" may be included as in "尾張旭市 (Gunjyo-gun, Yahata-machi)" a plurality of times in the field in some cases. In such a case as well, in order that the groups (4) and (6) may be properly divided into the words, the following rules are provided.

The character strings are searched from the second character in the field, and the division is carried out after "郡 (gun)"¹ which firstly appears. With respect to the words after the division, in order to carry out the distinction, <0 is assigned to the category name for the first word expressing the associated one of an ordinance-designated city or counties, and <W is assigned to the category name of the second word expressing the associated one(s) of words and towns. If the Chinese character "郡 (gun)" does not appear, then no division is carried out, and then the whole character strings are defined as the category beginning with <W (Steps 1103 and 1104). Now, with respect to "尾張旭市 (Owariasahi-shi)" as well in a line 1002 which is not divided, the definition sentence beginning with "<C" which has been generated is defined as the definition sentence beginning with "<0" again. At this time, "市 (shi)", "町 (cho)" and "村 (mura)" at the close are removed from the variable name beginning with "<0". In addition, on the basis of the address phrase code of the head of a line of the definition field of address phrase words, the name of the associated one of the prefecture names which is expressed by the syntactical category beginning with "<P" and the name of the associated one of the names of cities, wards and counties which is expressed by the syntactical category beginning with "<C" are combined with each other. This results in that the address phrase expressions from the prefecture names up to the names of the cities, wards and counties are defined in the definition of the syntactical category beginning with "<C". An example of the definition file of address phrase words which have been generated in the processings until now is shown in FIG. 12.

Figures 14, 15:
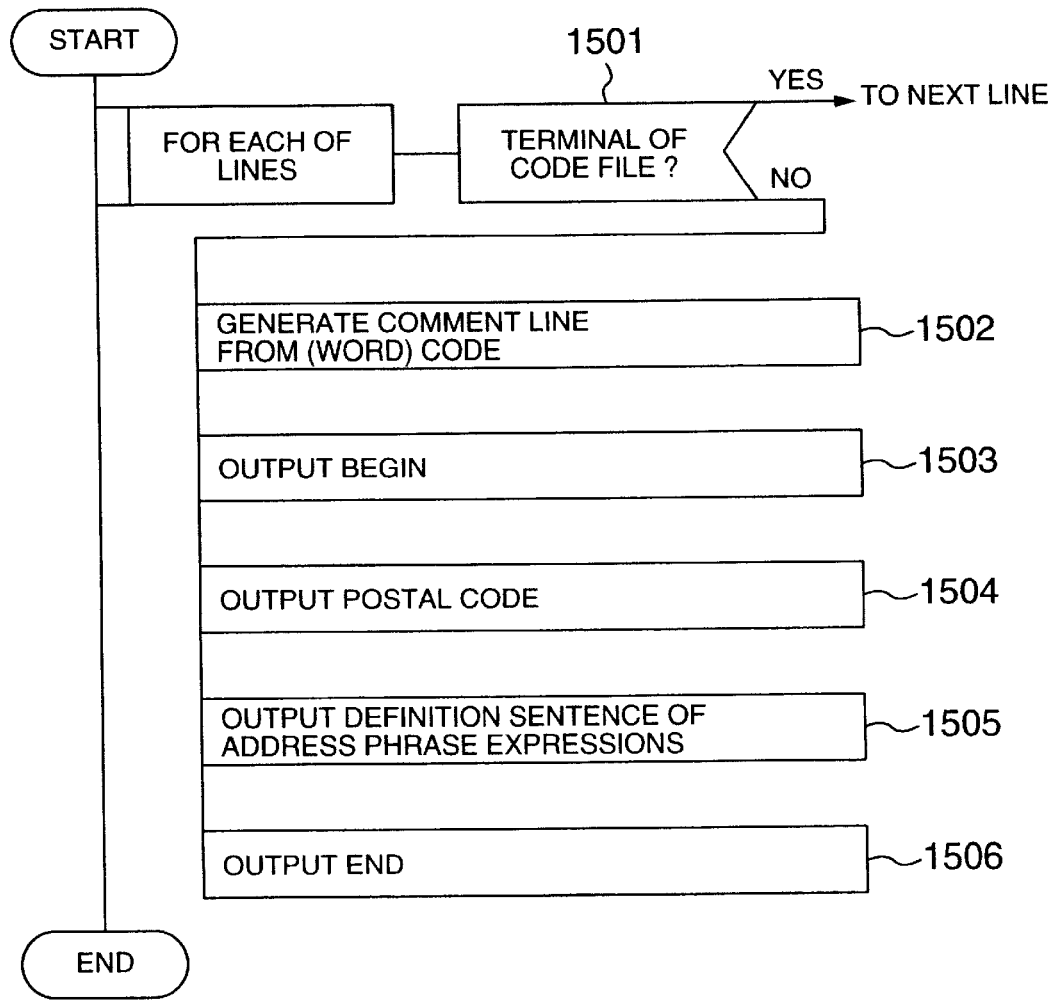
FIG. 14 is a diagram showing an example of the processing of generating an address phrase expression definition file (part 1)
FIG. 15 is a flow chart useful in explaining the processing of generating an address phrase expression definition file.

As the third processing in the processing 802 of generating the definition file of address phrase words, the definition sentence in which the right side thereof includes only the syntactical category names is transferred to the definition file of address phrase expressions. The definition sentence of the syntactical category beginning with "<C", with respect to the right side as well, includes only the syntactical category which is already defined. Then, only the syntactical category sentences each beginning with "<C" are extracted to be outputted to the definition file of address phrase expressions which will be generated specially next time. Thus, the definition made on the basis of the syntactical category of the address phrase words, and the definition made on the basis of the syntactical category of the address phrase expressions are perfectly separated from each other. As a result, when generating the dictionary of address phrase expressions written by Chinese characters and the dictionary of address phrase expressions written by katakana characters, if the definition files based on the syntactical categories of the address phrase words have only to be generated, then the files based on the syntactical category of the address phrase expressions can be made common between the dictionary written by Chinese characters and the dictionary written by katakana characters. Therefore, there is offered the effect that the redundancy of the dictionary of address phrase expressions can be reduced. The definition file of address phrase words which has been generated by the above-mentioned processings, and the definition sentence of the syntactical category beginning with "<C" which has been extracted are shown in FIG. 13 and FIG. 14, respectively.

As the final step in the transformation to the formal language expression 102, the processing 803 of generating the definition file of address phrase expressions is executed. The flow of the processing will hereinbelow be described with reference to FIG. 15 and a diagram useful in explaining an example of the processing shown in FIG. 16.

First of all, it is checked in Step 1501 whether or not the line of interest is the close of the code file. If so, then the processing is completed. If any of the unprocessed address phrase expressions remains, then the processing proceeds to Step 1502 in which the code specifying the address phrase expressions from the prefecture code, the city, ward and county code, and the town name and larger village section code of the code file is in turn outputted in the form of a comment line of the definition file of address phrase expressions. Next, the processing proceeds to Step 1503 in which "begin" is in turn outputted. This processing is executed in order to clarify the effective range of the syntactical category as well as to enhance the readability of the dictionary file. In addition, in Step 1504, the identifier of the address phrase expressions which is described in the postal code column of the code file is put into parentheses and then is outputted. Next, the processing proceeds to Step 1505 in which the syntactical category having the postal code as the name is in turn defined. More specifically, the identifier of the syntactical category is put into "< >" to be made the left side, while in the right side, the syntactical category corresponding to the code which is described formerly is retrieved from the definition file of address phrase words and the names of the categories are arranged one by one to generate the definition sentence as a line 1601. In this connection, the symbol ":: =" is sandwiched between the right and left sides. If the section name is present, then "( )" is added to the position after the category of the town name and larger village section of the corresponding address phrase expressions, and then the syntactical category name of the section name is added in "( )". When a plurality of section names are present, these section names are added as a line 1602 with the symbol "|" sandwiched by these section names.

Above, while the description has been given with respect to the transformation to the formal language expression relating to the dictionary of address phrase expressions written by Chinese characters, the generation of the dictionary of address phrase expressions written by katakana characters can also be realized by the same technique.

Next, the description will hereinafter be given with respect to the processing 104 of adding the variants based on the knowledge in FIG. 1. The expressions which are automatically added by the knowledge 105 for adding variants of address phrase expressions have the following three kinds out of the four kinds of variants which are already described.

(1) Variants by using different characters: the variants due to the difference in use of characters in the address phrase words.

"之 (no)", "ノ (no)" and "の (no)", "ガ (ga)",

"ヶ (ga)" and "が (ga)", and the like.

(2) Variants by abbreviations: the variants which are obtained by abbreviating the word(s) and the syntactical category.

The difference in the expression in which the prefecture name can be abbreviated.

(3) Variants by addition of phrase: the variants to which the ward(s) and the syntactical category are added.

The variants to which 字 (Aza: section name) can be added.

In order to add these variants, the procedure as shown in FIG. 17 is adopted. This procedure will hereinbelow be described by taking the address phrase expressions shown in FIG. 14 as an example. In a first step 1701 of the processing of adding the variants based on the knowledge, the specific character strings are replaced with the syntactical category in which the specific characters are already defined and which has the specific characters as the knowledge. In this connection, the knowledge is described in the form of the definition sentence of the syntactical category according to the context-free grammar employed in the present embodiment. Then, when the character string in the right side of the definition sentence is present in the definition file of address phrase words as an object of the processing, that character string is replaced with the syntactical category name in the left side. For example, since the character string of "大字" (Ohaza)" in a line 1801 of FIG. 18A is located at the head of the syntactical category expressing the town name and the larger village name, that character string is replaced with the defined syntactical category of "<V大字>" to provide a line 1804 of FIG. 18B. Since each of characters "埼玉県川越市小ヶ谷東田 (ga)" and "の(no)" in lines 1802 and 1803 is also not the head and the close of the address phrase words and each of them is sandwiched by the associated Chinese characters, "ヶ" and "の" are respectively replaced with the defined syntactical categories of "<Vヶ>" and "<Vの>" to generate a line 1805 and a line 1806. The format of the knowledge will be described later.

In a second Step 1702 of the processing of adding the variants based on the knowledge, the syntactical categorization of the character string which appears in a plurality of positions of the character string of address phrase words is carried out. Then, the variants by using different characters are generated. For example, since in AICHI prefecture, there are many address phrases each beginning with "尾張 (owari)", or in Kyoto city, there are many address phrases, each having as the prefix the address phrase, such as "西九条 (Nishi-kujyo)" or "一乗寺 (Ichijyoji)", expressing the wide range, the character string which is used like the prefex commonly to a plurality of town ranges is subjected to the syntactical categorization. As a result, for each of the character strings which appear commonly to a plurality of address phrases, the processing of adding the variants can be unified, and also the character strings of the variants do not need to be included in a plurality of positions in the dictionary of address phrase expressions. Therefore, it is possible to reduce the redundancy of the dictionary of address phrase expressions. For the definition file of address phrase words, two characters or three characters from head in the right side of the definition sentence are taken out to be held in a memory, and then if they are repeated in a plurality of definition sentences, then the character string of the common part is defined in the form of the syntactical category, and the original character string is replaced with the syntactical category name. In FIG. 9, since the three Chinese characters "西七条 (Nishi-shichijyo)" from the head in the right sides in a line 1901 and a line 1902 is commonly present, these characters are defined as the syntactical category to generate a line 1903. Then, the character string "西七条 (Nishishichijyo)" in the line 1901 and the line 1902 is replaced with the syntactical category "<V西七条 >" to generate a line 1904 and a line 1905, respectively.

In third Step 1703 of the processing of adding the variants based on the knowledge, the addition of the definition of the address phrase expressions by the syntactical category is carried out. The variants added in this processing are the variants by abbreviation and the variants by addition of phrase, and are mainly the differences of the words in the address phrase expressions, i.e., the line of the syntactical category. For example, there are examples in which the prefecture names may be abbreviated, "大字 (Ohaza)" in the town name and the larger village section may be abbreviated, and the address phrases, such as "一乗寺 (Nishi-kujyo)" in Kyoto-shi as described above, expressing the wide range may be abbreviated. Those are held as the rule of the format which will be described later, and the definition sentence is added to both of the definition file of address phrase expressions and the definition file of address phrase words. For example, in the case where the rule of adding the expression beginning with a city, ward and county name becomes effective for the definition of the address phrase expressions shown in FIG. 20A, the definition sentence in which "<P愛知県 " is abbreviated is added to the position next to the definition sentences of "南区 (Minami-ku)" and "尾張旭市 (Owariasahishi)", respectively. This result is shown in FIG. 20B, and a line 2001 and a line 2002 are the added definition sentences. Next, if the expression is defined, then the definition sentences in which the syntactical categories in the left side are identical to each other are made one definition sentence using the OR coupling operator "". As a result, a line 2003 and a line 2004 shown in FIG. 20C are respectively generated. In addition to the specification of the starting position, the abbreviation of a certain character string, and the like are also reflected on the TPDL on the basis of the same procedure. The addition of the variants to the definition file of address phrases can also be carried out on the basis of the same procedure.

Above, the processing of adding the variants based on the knowledge has been described.

Next, the description will hereinafter be given with respect to the knowledge expression of the knowledge 105 for adding variants of address phrase expressions which is used to add the variants.

The knowledge which is used to add the variants, as described above, has the following two kinds.

D1: The knowledge consisting of the definition sentence of the syntactical category based on the context-free grammar, and the condition which is used to activate the processing of the replacement of the character string with the syntactical category. The knowledge is used to add the variants using different characters in the definition of the address phrases.

D2: The knowledge consisting of the items in which the contents of the newly added definition sentence, such as the replacement or abbreviation for the syntactical category, are described with a line of the syntactical category in the definition sentence of address phrase expressions as the condition. The knowledge is used to generate both of the variants by abbreviation and the variants by addition of phrases.

A concrete example relating to the knowledge D1 is shown in FIG. 21. This knowledge consists of a condition part 2101 of the syntactical category transformation and a consequence part 2102 of the syntactical category transformation. The condition part 2101 of the syntactical category transformation consists of the four items, i.e., from the left-hand side, a field 2103 of category type expressing the type of syntactical category, a field 2104 of syntactical rules defining a line of character string becoming an object of the transformation, a field 2105 of location to be verified expressing which character string is made the condition of the transformation when the left side of the definition sentence of the syntactical category to be transformed is partitioned with the symbol "|" in the consequence part of the syntactical category transformation, and a field 2106 of pointer to the consequences pointing to the definition sentence of the syntactical category to be transformed in the consequence part of the syntactical category transformation. The consequence part of the syntactical category transformation is the definition file of common address phrase expressions in which the syntactical category for the character string independent of the area of D2 is defined out of the files of address phrase expressions which are written in accordance with the context-free grammar. Then, the meaning of the knowledge which is expressed in such a manner will hereinbelow be described by taking a rule 2107 as an example.

1. If in the definition sentence of the syntactical category in the definition file of address phrase words, the kind of syntactical category in the left side, i.e., any one of the alphabets next to "|" is one of "C, O, W, T, T and V" which are written in the field of category type; and 2. The left side of the definition sentence of the syntactical category in the definition file of address phrase words fulfills the following condition that either the first Chinese character "ケ (ga)" or the second Chinese character "ヶ (ga)", which is written in the field of location to be verified, out of the Chinese characters expressed in the right side of the definition sentence in the consequence part of the syntactical category transformation to which the field of pointer to the consequences points, as shown in the field of syntactical rules, begins with the associated Chinese character, and also includes the above-mentioned two Chinese characters in the middle thereof, then, the syntactical category "<Vヶ " is substituted for each of the above-mentioned characters in the right side in the definition sentence of the syntactical category in the definition file of address phrases.

Now, the description method for each of the fields of the condition part of the syntactical category transformation 2101 will hereinbelow be described.

The following alphabets are written in the field of category type, thereby limiting the definition sentence of the syntactical category in the definition field of address phrase words to which the knowledge of interest is applied.

P: the syntactical category of a prefecture name.

C: the syntactical category of a city, ward and county name.

O: the syntactical category of a county name and a city name.

W: the syntactical category of a ward name and a town name.

T: the syntactical category of a town name and a larger village section name.

V: the syntactical category of a section name and the others.

Next, the symbols which are used in the field of syntactical rules are described.

X: this symbol expresses a character (string) becoming an object of replacement which is written in the consequence part of the syntactical category transformation.

K: this symbol expresses an arbitrary Chinese character when describing the condition of a character string.

H: this symbol expresses an arbitrary cursive Japanese character when describing the condition of a character string.

T: this symbol expresses an arbitrary katakana character when describing the condition of a character string.

( ): this symbol is a symbol for showing specifically the range in which the kinds of above-mentioned characters are written.

+: this symbol expresses one or more repetitions of a character which is written prior thereto.

*: this symbol expresses zero or more repetition of a character which is written prior thereto.

^: this symbol expresses the head of a character string.

$: this symbol expresses the close of a character string.

For the consequence part of the syntactical category transformation, i.e., the file for accommodating therein the definition sentence in which the syntactical category for a character string used independently of any of areas, the following syntactical categories are prepared.

<Vケ> :: =ケ|ケ|が;

<Vノ> :: =ノ|之|の;

<Vヶ> :: =ノ|ヶ|の;

<V壱> :: =壱|―|1;

<V弐> :: =弐|二|2;

<V参> :: =参|三|3;

<V通> :: =通[り];

<V大字> :: =大字;

<V字> :: =野々下;

<V入ル> :: =入([[い]る][[イ]ル]);

<V上ル> :: =上([[ガ]ル][[が]る]);

<V下る> :: =下([[ガ]ル][[が]る]);

Now, the description will hereinafter be given with respect to D2 output of the knowledge for adding the variants. A concrete example thereof is shown in FIG. 22. This knowledge consists of the four fields, i.e., from the left-hand side, a field 2201 of category condition in which the line form of the syntactical category in the definition sentence of the address phrase expressions becoming an object of addition of the variants is described, a field 2202 of specification of the change processing in which the kind of change added to the definition sentence fulfilling the condition of a part of category condition is described, a field

2203 of specification of the number of chategories expressing the number of syntactical categories becoming an object of the processing in the part of specification of the change processing, and a field 2204 of specification of added category expressing a name of the syntactical category which is newly added when executing the addition processing. The meaning of the knowledge which is expressed in such a manner will hereinbelow be described by taking a rule 2205 as an example.

If the right side of the definition sentence of the syntactical category in the definition file of address phrase expressions, as written in the category condition, is constituted by the syntactical category expressing a prefecture name and the syntactical category expressing a city name following that syntactical category, as written in the field of specification of change processing or the field of specification of number of categories, the expression beginning with the syntactical category of "<V市内>" is added instead of the two syntactical categories consisting of the syntactical category of a prefecture name and the syntactical category of a city name.

Now, the description method of each of the fields will hereinbelow be described.

In the field of category condition, the line form of the syntactical categories in the definition file of address phrase expressions is described on the basis of the following characters and symbols.

< >: it expresses a name of the syntactical category.

P: the syntactical category of a prefecture name.

C: the syntactical category of a city, ward and county name.

O: the syntactical category of a county name and a city name.

W: the syntactical category of a ward name and a town name.

T: the syntactical category of a town name and a larger village section name.

V: the syntactical category of a section name and the others.

( ): a symbol for showing specifically the change in which the kinds of above-mentioned characters are written.

+: it expresses one or more repetitions of a character which is written prior thereto.

*: it expresses zero or more repetitions of a character which is written prior thereto.

^: it expresses the head of a right side in the definition sentence.

$: it expresses the close of a right side in the definition sentence.

.: it expresses an arbitrary character.

!: it expresses the negation of the following syntactical category.

In the field of specification of change processing, any one of the following processings is described.

SKIP: to add the expression permitting the abbreviation of the syntactical category which is described in the part of category condition.

REPLACE: from the head of the expression, to add the expression in which the categories having the number which are described in the field of specification of number of categories are replaced with the categories which are described in the field of added category.

In order to generate the dictionary of address phrase expressions which is used to read out an address which was written in the postal matter, as the knowledge for adding the variants relating to the following address phrase expressions, the following knowledges are prepared.

The syntactical category for a prefecture name may be abbreviated.

The syntactical categories for a prefecture name, and a city and county name may be abbreviated.

A prefecture name, a city and county name, a ward name, and a town name (following a county name) may be abbreviated.

For "市 (shi)", the expression of "市内 (shinai)" is added.

For "町 (cho)", the expression of "町内 (chonai)" is added.

For "~村 (son)", the expression of "村内 (son nai)" is added.

For "~区 (ku)", the expression of "区内 (kunai)" is added.

"大字 (Ohaza)" in the head of a town name and a larger village section name may be abbreviated.

"字 (Aza)" in the head of a section name may be abbreviated.

Above, the expression forms of the knowledges used to add the variants have been described.

Subsequently, the context-dependent variants addition processing 106 and the definition 109 of added and modified variants in FIG. 1 will hereinafter be described.

In this case, the addition of the definition sentence of the syntactical category to the definition file of address phrase words and the definition file of address phrase expressions is carried out manually. That is, the definition sentence is written by the handwork. However, since describing directly the syntactical category in accordance with the format of the context-free grammar increases the burden imposed on a worker, a 1/F which supports this work is prepared.

The method of adding the expression will hereinafter be described every two types of variants as described above.

Figure 23A:
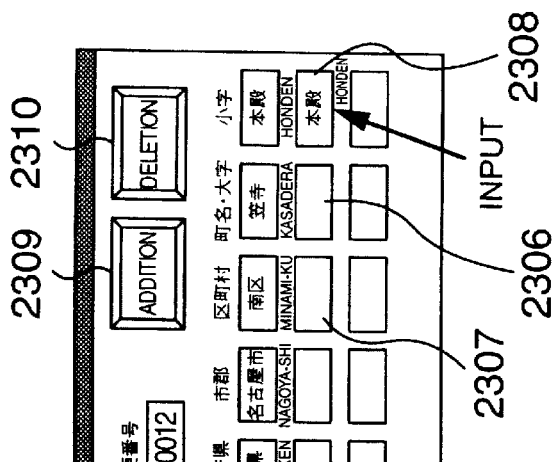
FIGS. 23A, 23B and 23C are respectively diagrams showing examples of a user interface for adding variants of the address phrase expressions manually.
Figure 23B:
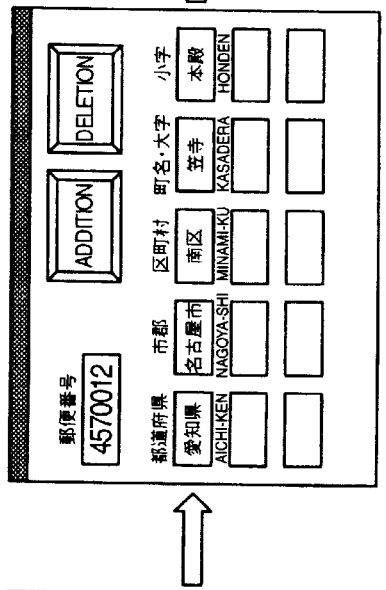
Figure 23C:
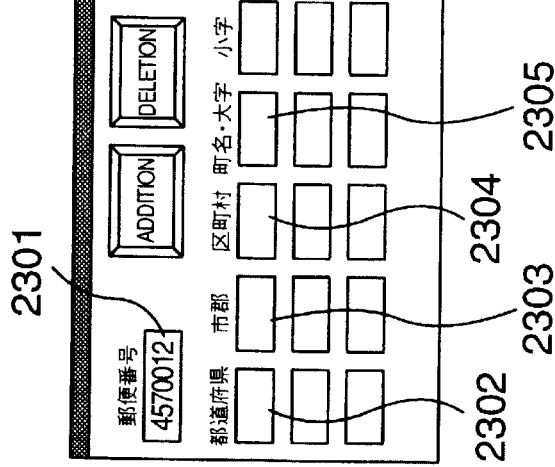

First of all, the description will hereinbelow be given with respect to the procedure of adding the variants to the address phrase expressions. Then, the work for adding the variants to the address phrase expressions is carried out through a user interface as shown in FIGS. 23A, 23B and 23C. When firstly, a worker inputs a postal code as the identifier for the area becoming an object of the edition to a postal code input column 2301 (refer to FIG. 23A), the corresponding definition sentence of address phrase expressions is retrieved from the definition file of address phrase expressions on the basis of the postal code thus inputted. For example, when the definition sentence of address phrase expression of "<4570012> ::=<C名古屋市南区><T笠寺><V本殿>", the syntactical category which is described in the right side thereof is fetched, and the definition sentence having the syntactical category corresponding to a city, ward and county name as the left side is further retrieved to fetch the syntactical categories corresponding to a prefecture name, and a city and county name. Then, the names of these syntactical categories are displayed on a prefecture display column 2302, a city and county display column 2303, a ward and town display column 2304, a town name and a larger village section display column 2305, and a section name display column, respectively. If a plurality of syntactical categories are used, then all of them are displayed altogether (refer to FIG. 23B). Next, a worker inputs the expression to be added (refer to FIG. 23C). When adding the expression in which a prefecture name, a city name, a ward name and a town name and a larger village section name are all abbreviated, the town name and a larger village section display column 2306, and the ward and town name display column 2307 are each made blank, and "本殿(honden)" is inputted to the section name display column 2308. Then, an addition button 2309 is pressed down, thereby generating and adding the specified expression.

Figure 25:
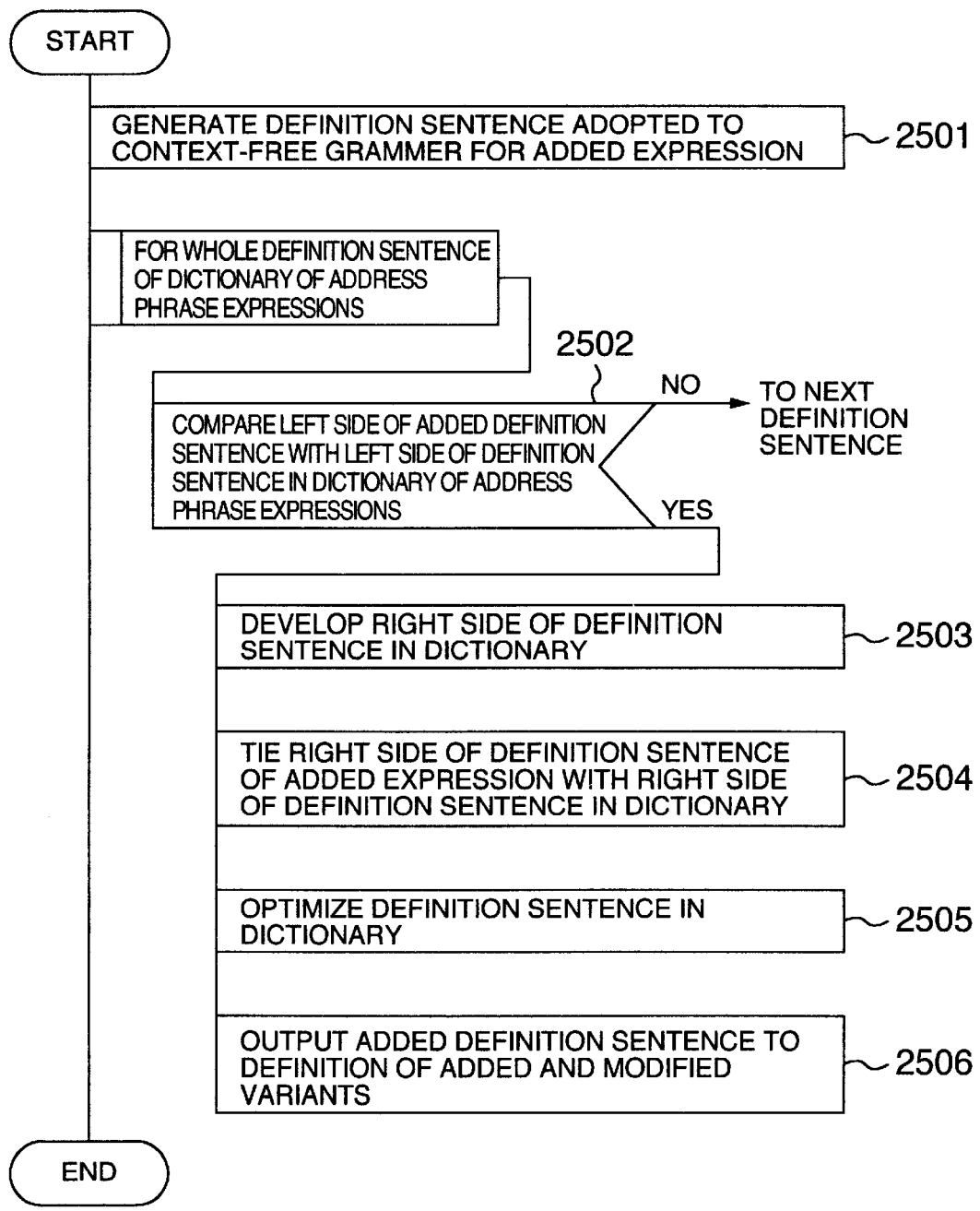
FIG. 25 is a flow chart useful in explaining the addition of variants in the context-dependent variants addition and deletion processing.

A flow of the processing of this expression is shown in FIG. 25.

First of all, in Step 2501, the expression which was added through the user interface as shown in FIGS. 23A, 23B and 23C is made the form of the definition sentence adapted to the context-free grammar. For the expression of "本殿" which was added in FIG. 24C to the address phrase expression in which the postal code is expressed by 4570012, the definition sentence of the syntactical category of "<4570012> :: =<V本殿>" is generated. For the definition sentence of the syntactical category in the dictionary of address phrase expressions, the sentence is retrieved in which the left side thereof is the same as that of the above-mentioned added definition sentence (Step 2502). If as a result of the retrieval, the corresponding definition sentence is present, then in Step 2503, the left side of the definition sentence of the retrieval result is developed in such a way that the character strings of address phrase expressions are OR tied. That is, the definition sentence of A :: =(B C)D is changed into

A :: =BD|CD.

In Step 2502, for the definition sentence in the changed dictionary of address phrase expressions, the right side of the added definition sentence is OR tied, thereby carrying out the integration. As a result, the following definition sentence of address phrase expressions is generated:

the address phrase expression knowledge of

<4570012> :: =<C名古屋市南区><T笠寺><V本殿>;

is tied with

<4570012> :: =<V本殿>;

to generate the following definition sentence of address phrase expression

<4570012> :: ==<C名古屋市南区><T笠寺><V本殿><V本殿>;

Next, in Step 2505, the optimization of the definition formula, i.e., the reduction of the number of used syntactical category names is carried out.

That is, this processing is such that;

The definition formula,

A :: =BD|CD;

is changed into

A :: =(B|C)D; or the definition formula,

A :: =BC|B;

is changed into

A :: =B[C];

As a result, the following expression is obtained,

<4570012> :: =<C名古屋市南区><T笠寺><V本殿>;

In addition, in Step 2506, the added definition sentence

<4570012> :: =<V本殿>;

is stored in a field 109 of definition of added and modified variants in FIG. 1 which will be described later.

Figure 26:
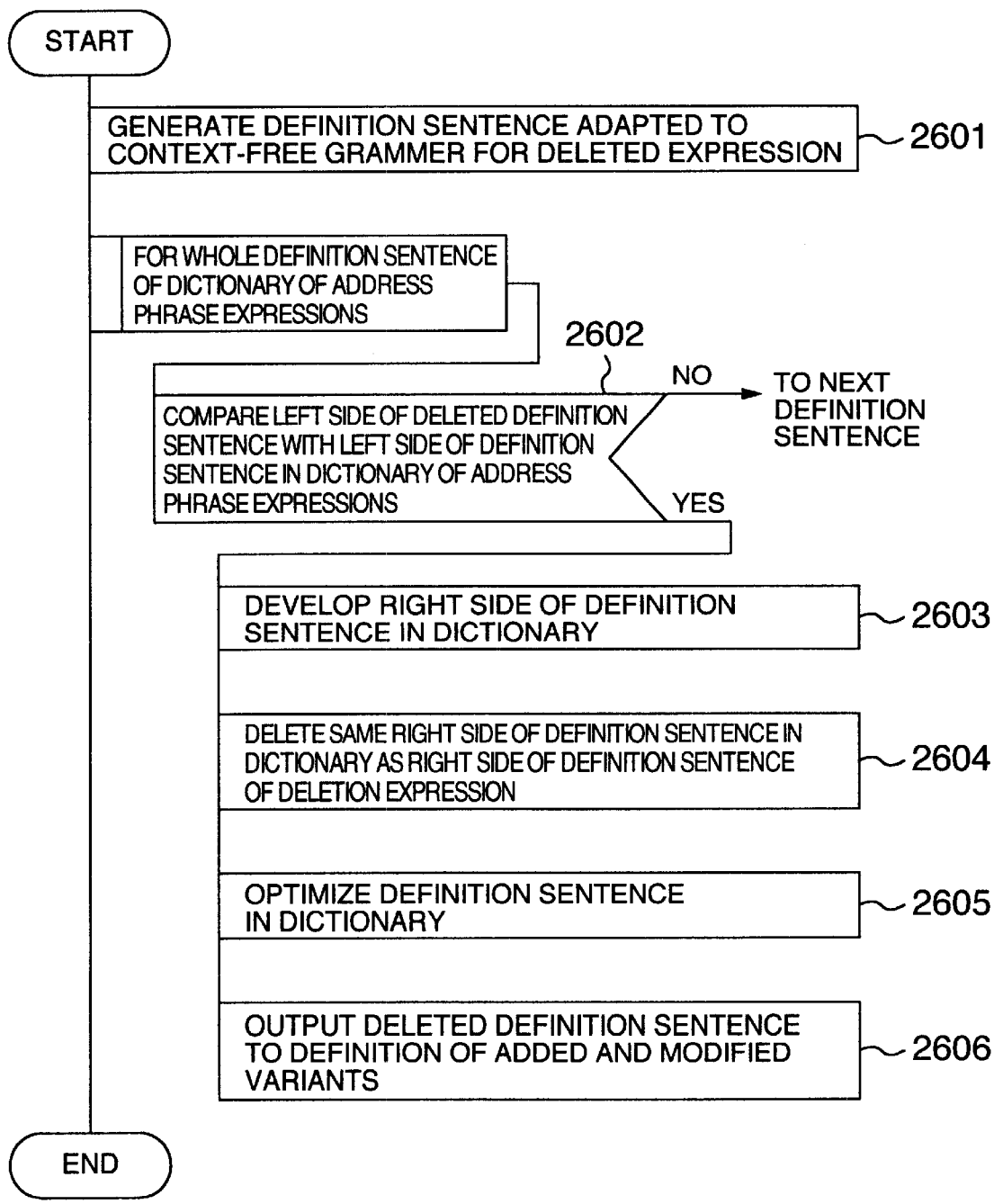
FIG. 26 is a flow chart useful in explaining the deletion of variants in the context-dependent variants addition and deletion processing.

When deleting the associated one(s) of the variants, the deletion is carried out on the basis of a flow of the processings as shown in FIG. 26.

Figure 24A:
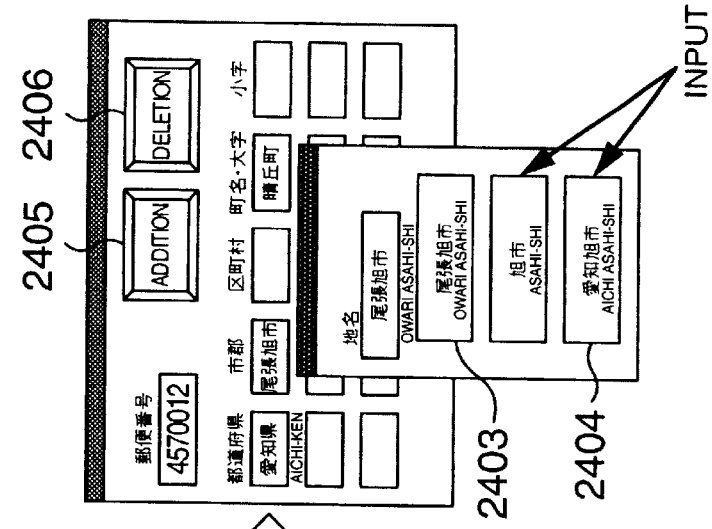
FIGS. 24A, 24B and 24C are respectively diagrams showing examples of a user interface for adding address phrase words of the address phrase expressions manually.
Figure 24B:
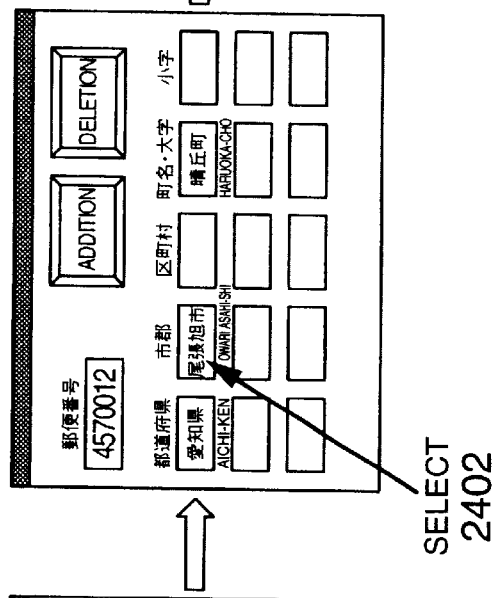
Figure 24C:
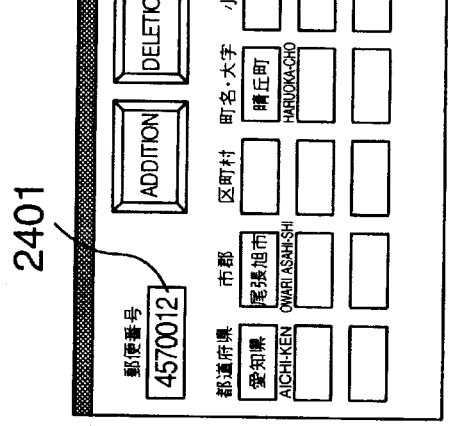

First of all, in Step 2601, the expression which has been selected through a user interface as shown in FIGS. 24A, 24B and 24C is made the format of the definition sentence adapted to the context-free grammar. When the expression of "本殿" as the address phrase which is expressed on the basis of the postal code of 4570012 is intended to be deleted, the definition sentence of the syntactical category of "<4570012> :: =<V本殿>" is generated. For the definition sentence of the syntactical category in the dictionary of address phrase expressions, the sentence is retrieved in which the left side thereof is the same as that in the above-mentioned added definition sentence (Step 2602). If as a result of the retrieval, the corresponding definition sentence is present, then in Step 2603, the right side of the definition sentence obtained by the retrieval result is developed in such a way that the address phrase expression character strings are OR tied with each other. That is, the following definition formula

A:: =(B|C)D is changed into the following formula

A:: =BD|CD.

The processing in Step 2604 is executed by deleting the same element as that of the right side of the added definition sentence from the OR tied elements in the right side of the definition sentence in the dictionary of address phrase expressions thus changed thereinto. As a result, the following element

<4570012> :: =<V本殿>;

is deleted from the following address expression knowledge

<4570012> :: =<C名古屋市南区><T笠寺><V本殿><V本殿> and as a result, the following definition sentence of address phrase expressions is generated.

<4570012> :: =<C名古屋市南区><T笠寺><V本殿>

Next, in Step 2505, the optimization of the definition formula, i.e., the reduction of the number of used syntactical category names is carried out. That is, this deletion processing is the processing in which the following definition sentence

A:: =BD|CD;

is changed into the following formula,

A:: =(B|C)D;

or the following definition formula

A:: =BC|B;

is changed into the following formula.

A:: =B[C];

In addition, in Step 2506, the following deleted definition sentence

<4570012 > :: =<V本殿> is stored in the file 109 of definition of added and modified variants shown in FIG. 1 which will be described later.

As a second example of addition of the variant(s) by manually, the case where the variant(s) relating to some specific address phrase word is(are) added and modified will hereinafter be described. This work is carried out through the user interface as shown in FIGS. 24A, 24B and 24C. When similarly to the case of the addition of the variant(s) relating to the address phrase expression, a worker inputs a postal code as the identifier of an area becoming an object of the edition to a postal code input column 2401 (refer to FIG. 24A), on the basis of the postal code thus inputted, the corresponding definition sentence of address phrase expression is retrieved from the definition field of address phrase expressions. Subsequently, after having selected the syntactical category name of the corresponding hierarchy as shown in FIG. 24B, the word definition addition and modification interface is activated. At the time when the word definition addition and modification interface has been activated, the definition sentence of address phrase words having the syntactical category name becoming an object of addition and modification as the left side is retrieved. Then, the character string which is described is the right side of the definition sentence of address phrase words thus retrieved is displayed on an address phrase display/input column 2403 shown in FIG. 24C. Next, if a worker adds the expression (the character string) which he/she wants to add and modify to an address phrase words display/input column 2404, then the definition sentence of the address phrase words which has the syntactical category name becoming an object of addition and modification in the left side and also which has the added character string in the right side is added to the definition file of address phrase words. As a result, the processings shown in FIG. 25 are executed, the definition sentence of "<O尾張旭市> :: =—;" is generated, and this definition sentence is added to the definition file of address phrase words in accordance with the similar procedure to that in the processing of addition of the variants based on the above-mentioned knowledge. The definition sentence of syntactical category thus generated is outputted by executing the processing 108 of outputting the added and modified variants to be stored in the definition of added and modified variants shown in FIG. 1. In this connection, the processing of deleting the word definition is also executed by utilizing the technique shown in FIG. 26.

Figures 27, 28:
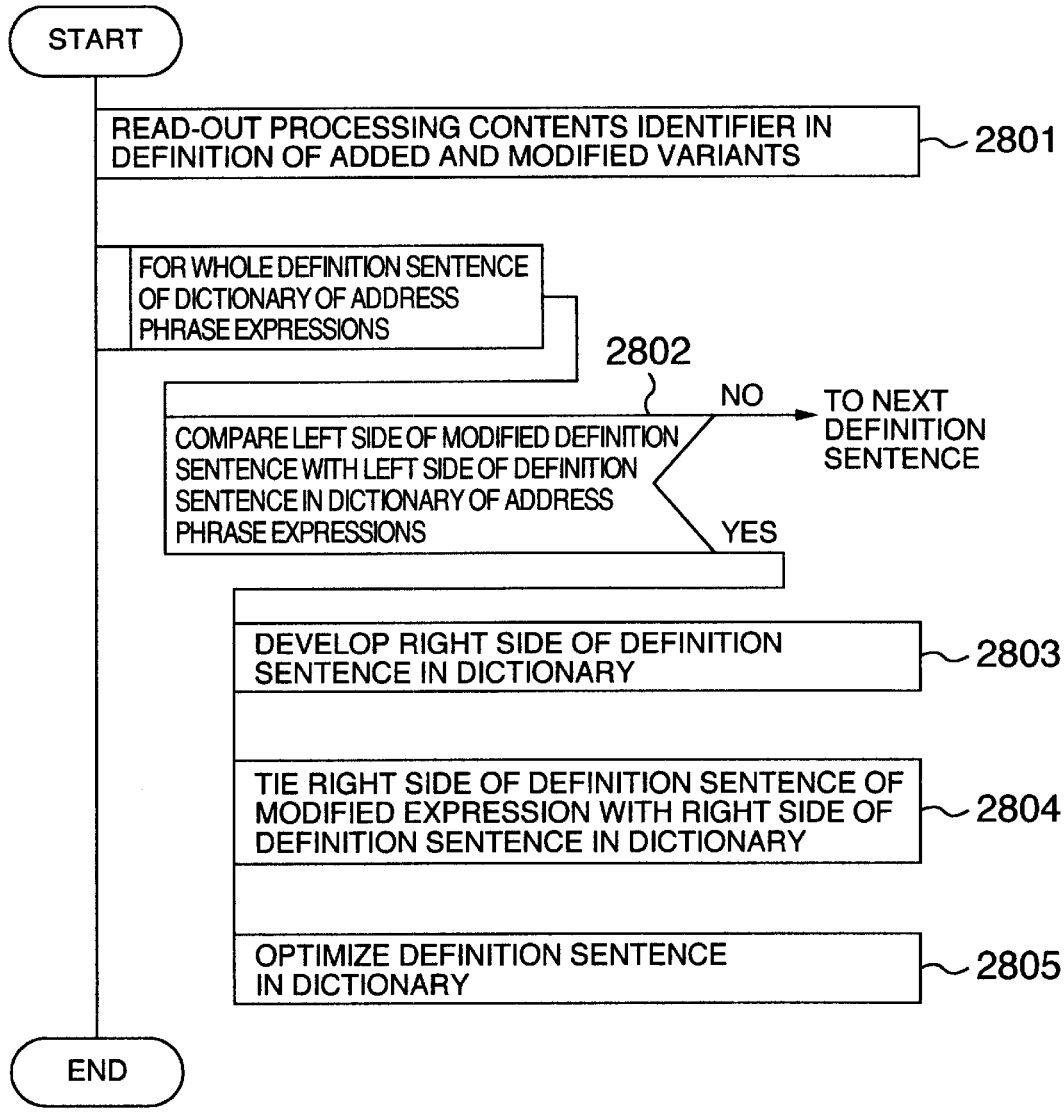
FIG. 27 is a diagram showing an example of the definition of added and modified variants.
FIG. 28 is a flow chart useful in explaining the processing of deleting the variants based on an instance.

An example of the definition of added and modified variants which is outputted in the above-mentioned context-dependent variants addition processing is shown in FIG. 27.

In this case, the added definition sentence, and the deleted definition sentence are both stored in the form of the same form as that in the dictionary of address phrase expressions. But, in order to show which of the addition processing or the deletion processing is executed, the form of a comment sentence is employed in the head of a line, and the identifiers of the processing contents are written thereto. The identifiers of the processing contents are the two kinds as follows.

ADD#: addition

DFL#: deletion

Subsequently, the description will hereinafter be given with respect to the variants addition processing 111 based on an instance in FIG. 1. The processing executed in the variants addition processing 111 based on an instance is the same as the processing of adding and deleting the associated one(s) of the variants which is executed in the context-dependent variants addition processing except that the added and modified variants definition 109 is read out, and in accordance with the identifier of the processing contents written therein, the processing of addition and the processing of deletion are switched over each other. By executing the variants addition processing based on an instance, the variant(s) which was(were) added in the past by the handwork can be automatically added to the dictionary of address phrase expressions.

A flow of the variants addition processing based on an instance is shown in FIG. 28.

First of all, in Step 2801, the definition 109 of the added and modified variants as shown in FIG. 27 is read out, and then the identifier of the processing contents which is written in the comment inside of the head of the line thereof and the definition sentence of the following expression are both read out. In the case where the expression of "本殿" as the address phrase expression in which the postal code is expressed as 4570012 is written in the definition file of the added and modified variants in such a way that it is intended to be added thereto, the same sentence as the left side of the added definition sentence which has the left side of "<4570012>=<V本殿>" is retrieved (Step 2802). If as a result of the retrieval, the corresponding definition sentence is present, then in Step 2803, the right side of the definition sentence obtained from the retrieval result is developed in such a way that the address phrase expression character strings are OR-tied with one another. In Step 2804, the definition sentence in the dictionary of address phrase expressions which has been changed is OR-tied with the left side of the added definition sentence to be integrated with each other. As a result, the following definition sentence of address phrase expression a is generated.

<4570012>=<C名古屋市南区><T笠寺><V本殿><V本殿>;

Next, in Step 2805, the optimization of the definition formula, i.e., the reduction of the number of used syntactical category names is carried out. As a result, the following definition sentence is obtained.

<4570012> :: =<C名古屋市南区><T笠寺><V本殿>

Figure 29:
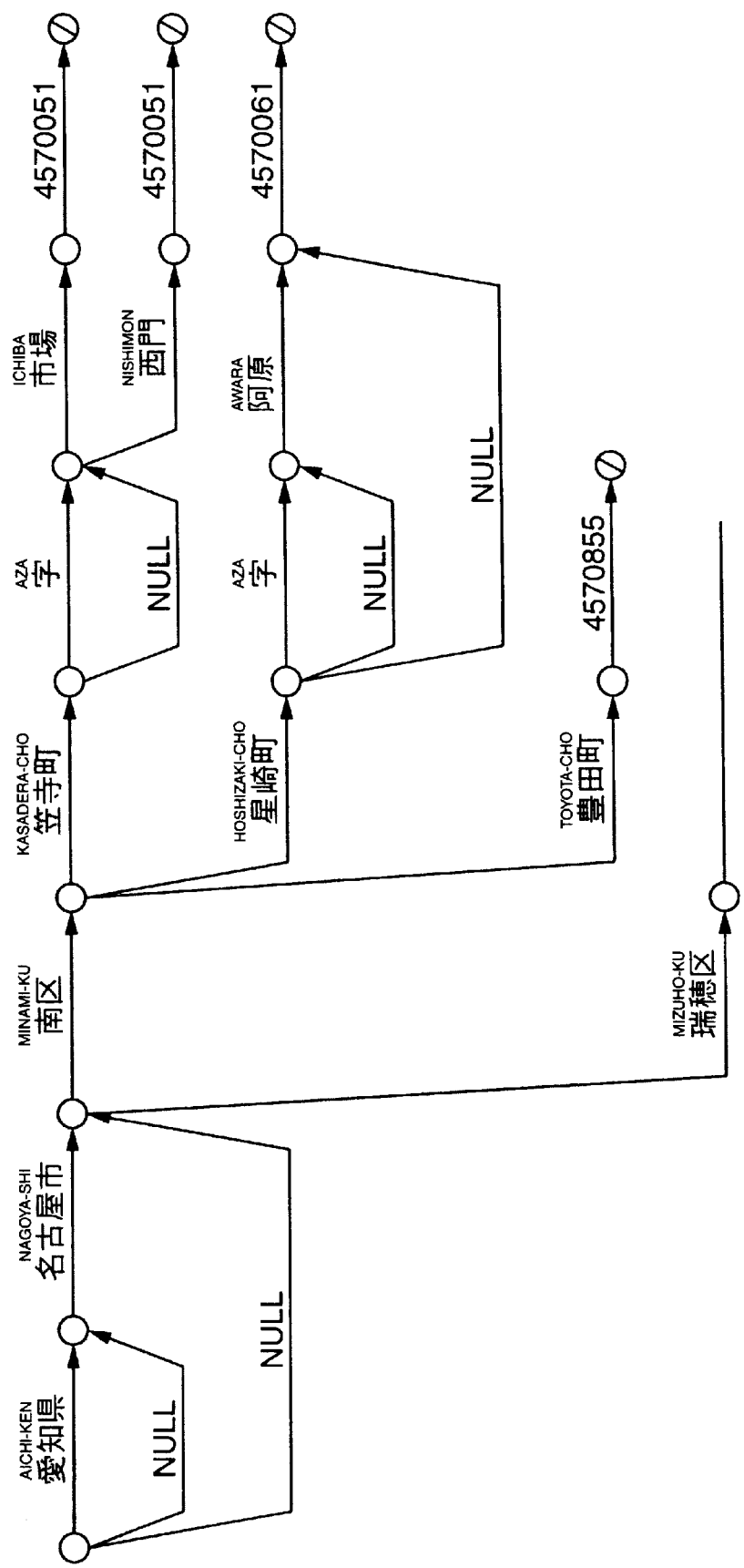
FIG. 29 is a diagram showing an example of a dictionary of address phrase expressions in the form of a graph.

After having executed the above-mentioned processings, the dictionary 103 of address phrase expressions for the address phrases matching is generated. As has already been described, this dictionary of address phrase expressions adopts the form of the dictionary source file. As for the technique for transforming the form of the dictionary of address phrase expressions which is expressed in accordance with the context-free grammar into the dictionary binary form corresponding to the graph form, for example, there may be employed the technique for producing a transition graph in accordance with the production rule as described in an article of "INTRODUCTION TO NATURAL LANGUAGE PROCESSING" (Kindaikagaku-sha, ISBN-7649-0143-9), pp. 19 to 31, or the like. An example of the dictionary of address phrase expressions of a graph form which is generated from an example of the context-free grammar expression of the address phrase expressions employed in the present embodiment is shown in FIG. 29. The dictionary of address phrase expressions having the graph form is the directed graph in which each of the sides corresponds to the partial string and each of the vertexes corresponds to the boundary of the partial strings. The direction of each of the sides coincides with the character order in the character string. The side designated with NULL means that any of character may not be present in that position. In addition, a circle having a line at bottom right thereof in the figure shows the starting position of the address phrase character string. In addition, a circle having an oblique line across the center thereof shows the end of the character string. In addition, in a node corresponding to the end of the character string, numerals (a postal code in the present embodiment) as the identifier for the address phrase expression specified by <numeral> expression is stored.

The foregoing can be similarly managed with respect to the variants of the address phrase expressions in English sphere.

For example, the expression of "South 9th Street", as shown in FIG. 30, "South" is given a brief account of "S", or the whole words may be abbreviated. In addition, with respect to the expression of "9th", only "9" may be expressed by English in some cases. Further, "Street" is given a brief account of "St", or the whole word may be abbreviated in some cases. Also, the word order of the parts corresponding to "South" or "9th" may be changed in some cases.

If the above-mentioned address phrase expressions are described in accordance with the context context-free grammar shown in the present invention, the expression becomes as FIG. 31.

Figure 32:
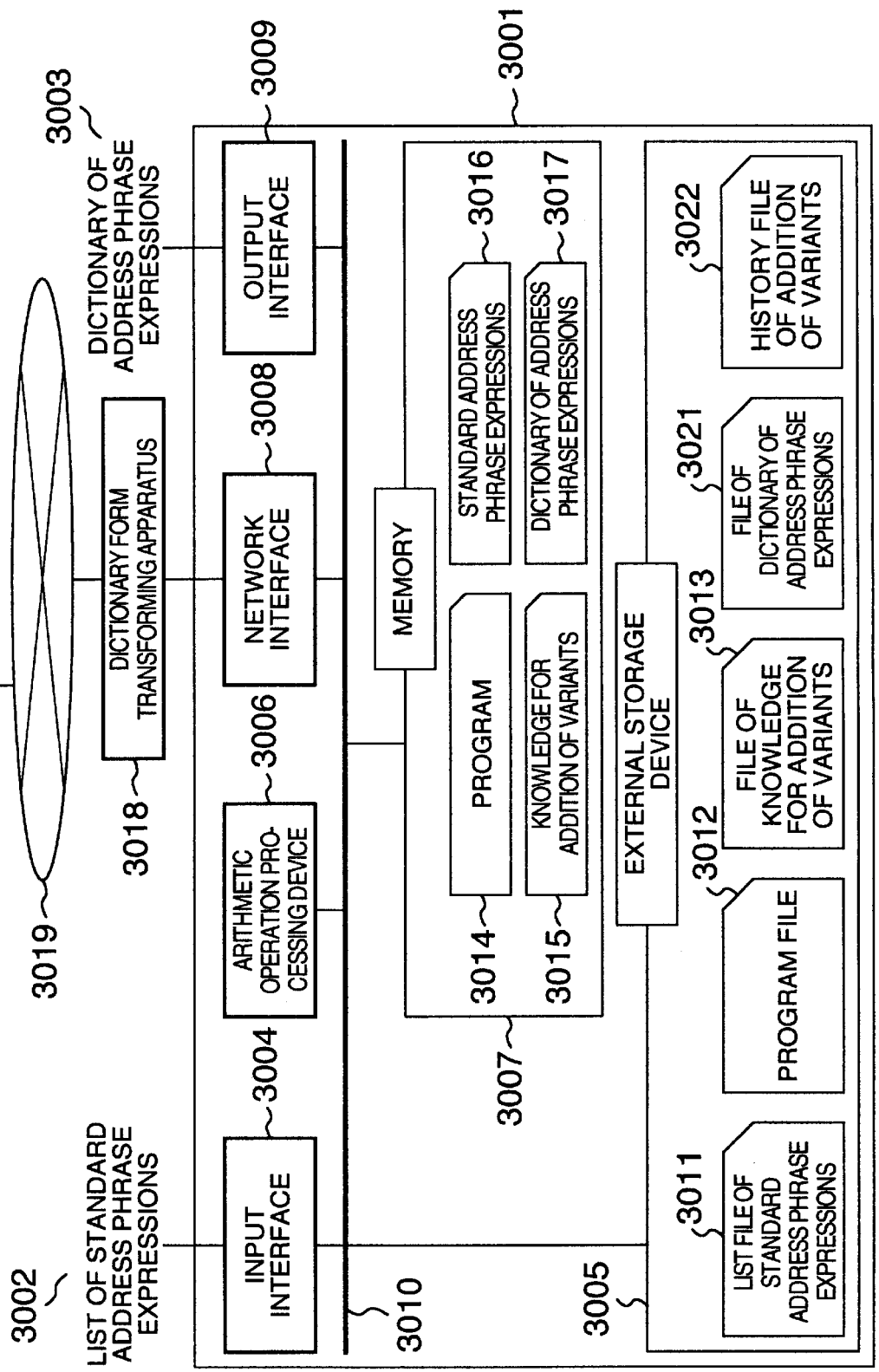
FIG. 32 is a block diagram showing an example of a hardware configuration of a machine for generating a dictionary of address phrase expressions.

A configuration of the hardware in the present embodiment is shown in FIG. 32. A machine 3001 for generating a dictionary of address phrase expressions is a machine in which each of the standard address phrase expressions is separated every word to be stored, and which receives as an input thereof a list 3002 of standard address phrase expressions to output a dictionary 3003 of address phrase expressions expressed in accordance with the context-free grammar. The machine 3001 includes: an interface 3004 for input for processing the file input from the outside; an external storage device 3005 for storing therein the various kinds of files; an arithmetic operation processing device 3006; a memory 3007; a network interface 3008 for processing the result output to the outside; and an interface 3009 for output. These elements are all provided in the inside of the machine 3001 and are connected to one another through a bus 3010.

The list of standard address phrase expressions is inputted to the machine for generating a dictionary of address phrase expressions through the I/O device 3004 and is stored in the external storage device 3005 to be a list file 3011 of standard address phrase expressions, and also is copied on the memory 3007 to be a standard address phrase expressions 3016. At the time when executing the processing of generating the dictionary of address phrase expressions, a program file 3012, for processing of generating a dictionary of address phrase expressions, which file is stored in the external storage device, and a knowledge file 3013 for adding the variants are both loaded into the memory to be a program 3014, and a knowledge 3015 for adding the variants, respectively. For a standard address phrase expressions 3016 which are loaded into the memory through the interface for input or from the external storage device, the arithmetic operation processing device generates a dictionary 3017 of address phrase expression on the memory in accordance with the method of the present invention.

The result thereof is written in the form of a dictionary file 3021 of address phrase expressions to the external storage device or is outputted through the output interface 3009 such as a display device. The address phrase expressions which are added and modified through the program 3014 are stored in the form of a variants addition history file 3022 in the external storage device in order to be utilized when executing the subsequent processing of generating a dictionary of address phrase expressions.

In addition, by the operation of a dictionary form transforming apparatus 3018 for transforming the address phrase expressions from the dictionary source file form to the dictionary binary form as described in the present embodiment, the transformation to the dictionary of address phrase expressions of the dictionary binary form may be carried out, and the resultant information may be loaded into a mail sorting machine 3020 through a network 3019 to execute the processing of reading out addresses.

In this connection, while for the convenience of the description, the present invention has been described by taking as an example the address phrases or the addresses of Japan, it should be noted that the present invention is not limited to the address phrases or the addresses of Japan, or the address phrases or the addresses which are expressed by the Japanese language. Even for the address phrases or the expressions of foreign countries, or the address phrases or the addresses which are expressed by English or other languages, the present invention may be implemented. In addition to only the above-mentioned categories, the category is newly added and modified as may be necessary, or the addition and modification of the words belonging to these categories are carried out, whereby the present invention may also be applied to the address phrases and the addresses og foreign countries, or the address phrases and the addresses which are expressed by foreign languages.

As set forth hereinabove, according to an embodiment of the present invention, from a list of address phrase expressions in which only the standard address phrase expressions are written for one area, the variants can be automatically added thereto as much as possible, and hence a dictionary of address phrase expressions having a high completeness of the dictionary can be readily generated. In addition, for the variants as well which could not be conventionally automatically added thereto, means for adding such variants manually is provided, whereby the variants peculiar to an area becoming an object of generation of a dictionary of address phrase expressions can be added and hence the completeness of the dictionary can be further enhanced. In addition, the result of the addition work manually is preserved to be utilized in the subsequent processing of generating a dictionary, whereby the number of times of addition work manually can be suppressed and also the work for generating a dictionary can be simplified.

While the present invention has been particularly shown and described with reference to the preferred embodiments and the specified modifications thereof, it will be understood that the various changes and other modifications will occur to those skilled in the art without departing from the scope and true spirit of the invention. The scope of the invention is therefore to be determined solely by the appended claims.

What is claimed is:

1. An apparatus for generating a dictionary of target phrases used in a process of recognition of character strings as a reference for matching a result of character classification, comprising:

an input interface for receiving as its input a first address phrase included in a list of address phrase expressions;

a memory for storing a dictionary of address phrase variants, including rules for generating variants of address phrase expressions; and a processing device for generating variants of address phrases which generates a second address phrase which is different in expression from said first address phrase to store said second address phrase in a storage device holding said dictionary of target phrases, based on said input first address phrase, and said knowledge of rules about variants included in said dictionary of address phrase variants, wherein said address phrase variants are address phrases referring to a same address but expressed using different character strings.

2. An apparatus for generating a dictionary of target phrases used in a process of recognition of character strings as a reference for matching a result of character classification, comprising:

a storage device for storing a dictionary of address phrase expressions including a list of address phrase expressions including a first address phrase;

a memory for storing a dictionary of address phrase variants, including rules for generating variants of address phrase expressions; and a processing device for generating variants of address phrase which generates a second address phrase which is different in expression from said first address phrase to store said second address phrase in a storage device holding said dictionary of target phrases, based on said input first address phrase, and said knowledge of rules about variants included in said dictionary of address phrase variants, wherein said address Phrase variants are address phrases referring to a same address but expressed using different character strings.

3. An apparatus for generating a dictionary of target phrases according to claim 1, wherein said processing device further transforms said first address phrase into an expression in formal language and generates said second address phrase by referring to the first address phrase which has been transformed into said expression in formal language.

4. An apparatus for generating a dictionary of target phrases according to claim 1, wherein said list of address phrase expressions is a list of address phrase expressions for holding said first address phrase with said first address phrase expressed in a sequence of a plurality of syntactical categories, and said processing device generates said second address phrase by referring to at least one of said plurality of syntactical categories.

5. An apparatus for generating a dictionary of target phrases according to claim 4, wherein said list of address phrase expressions holds code information assigned to each of said plurality of syntactical categories.

6. An apparatus for generating a dictionary of target phrases according to claim 4, wherein said second address phrase is an address phrase having said sequence of a plurality of syntactical categories of said first address phrase which are rearranged.

7. An apparatus for generating a dictionary of target phrases according to claim 1, further comprising:

a reception means for receiving an input to add a third address phrase which is different in expression from said first and second address phrases, wherein said processing device inputs said third address phrase according to said input.

8. An apparatus for generating a dictionary of target phrases according to claim 7, further comprising, storage means for receiving as its input said third address phrase and a definition sentence of address phrase expression corresponding to said first address phrase to store therein a pair of said third address phrase and said definition sentence, wherein said processing device refers to said storage means, and outputs said third address phrase as a variant of said first address phrase.

9. A method of generating a dictionary of target phrases in a dictionary generating apparatus having an input interface, a processing device and a memory for storing a dictionary of address phrase variants, including rules for variants of address phrase expressions, comprising the steps of:

receiving, by said input interface, a first address phrase included in a list of address phrase expressions;

generating by said processing device, a second address phrase based on said first address; phrase, and said rules for generating variants included in said dictionary of address phrase expressions; and storing said second address phrase in said dictionary of target phrases, wherein said dictionary of target phrases is a dictionary used in a Process of recognition of character strings as a reference for matching a result of character classification, and said address phrase variants are address Phrases referring to a same address but expressed using different character strings.

10. A method of generating a dictionary of target phrases in a dictionary generating apparatus having a storage device for storing a dictionary of address phrase variants including a list of address phrase expressions including a first address phrase, a memory for storing a dictionary of address phrase variants including rules for generating variants of address phrase expressions, and a processing device, comprising the steps of: inputting a first address phrase from a dictionary of address phrase expressions including a list of address phrase expressions for holding said first address phrase, and rules for generating variants from said dictionary of address phrase variants to generate, in said processing device, a second address phrase which is different in expression from said first address phrase to store said second address phrase thus generated in said dictionary of target phrases, wherein said dictionary of target phrases is a dictionary used in a process; of recognition of character strings as a reference for matching a result of character classification, and said address phrase variants are address phrases referring to a same address but expressed using different character strings.

11. A method of generating a dictionary of target phrases according to claim 10, wherein said processing device further transforms said first address phrase into an expression in formal language, and generates said second address phrase by referring to said first address phrase which has been transformed into said formal language.

12. An apparatus for generating a dictionary of target phrases according to claim 1, wherein said rules for generating variants of address phrase expressions include at least a rule for generating variants using different characters, variants by abbreviations, or variants by addition of phrase, in relation with an input address phrase expression.

13. An apparatus for generating a dictionary of target phrases according to claim 1, wherein said dictionary of target phrases comprises address phrase expression described in accordance with context-free grammar.

14. A method of generating a dictionary of target phrases according to claim 9, wherein said rules for generating variants of address phrase expressions include at least a rule for generating variants using different characters, variants by abbreviations, or variants by addition of phrase, in relation with an input address phrase expression.

15. A method of generating a dictionary of target phrases according to claim 9, wherein said dictionary of target phrases comprisea address phrase expression described in accordance with context-free grammar.

* * * * *